US005457687A

United States Patent [19]

Newman

[11] Patent Number: 5,457,687
[45] Date of Patent: Oct. 10, 1995

[54] METHOD AND APPARATUS FOR BACKWARD EXPLICIT CONGESTION NOTIFICATION (BECN) IN AN ATM NETWORK

[75] Inventor: Peter Newman, Mountain View, Calif.

[73] Assignee: Network Equipment Technologies, Inc., Redwood City, Calif.

[21] Appl. No.: 115,857

[22] Filed: Sep. 2, 1993

[51] Int. Cl.⁶ .................................................. H04J 3/02
[52] U.S. Cl. ........................... 370/85.3; 370/13; 370/60; 370/85.2; 370/94.1
[58] Field of Search ............................. 370/60.1, 60, 84, 370/13, 94.1, 94.2, 95.1, 95.3, 85.2, 85.3

[56] References Cited

U.S. PATENT DOCUMENTS

| | | | |
|---|---|---|---|
| 5,164,938 | 11/1992 | Jurkevich et al. | 370/84 |
| 5,224,091 | 6/1993 | Brandt | 370/17 |
| 5,280,470 | 1/1994 | Buhrke et al. | 370/60.1 |
| 5,313,454 | 5/1994 | Bustini et al. | 370/60 |

*Primary Examiner*—Douglas W. Olms
*Assistant Examiner*—Shick Hom

*Attorney, Agent, or Firm*—Fliesler, Dubb, Meyer & Lovejoy

[57] ABSTRACT

Reactive congestion control in an asynchronous transfer mode (ATM) network where the network is formed by the interconnection of nodes each including a forward path for transfer of information from source to destination through the network and a return path for returning congestion control signals. Each source includes a modifiable issue rate unit which issues forward information signals at different rates for virtual channels in response to the presence and absence of congestion signals received on the return path. When congestion occurs, for example, a queue exceeds a threshold, a request is made to send congestion signals, in the form of backward explicit congestion notification (BECN) cells, back to the sources of the virtual channels currently submitting traffic to the queue. On receipt of a BECN cell on a particular virtual channel, a source reduces it transmission rate for the indicated virtual channel. If no BECN cells are received on a particular virtual channel for a certain period of time, a source may gradually restore its transmission rate. In order to reduce the number of congestion cells, a filter is provided for filtering requests for congestion signals. Fairness is promoted in the recovery of transmission rates using a rate recovery algorithm that increases slower rate transmitters faster than higher rate transmitters.

45 Claims, 8 Drawing Sheets

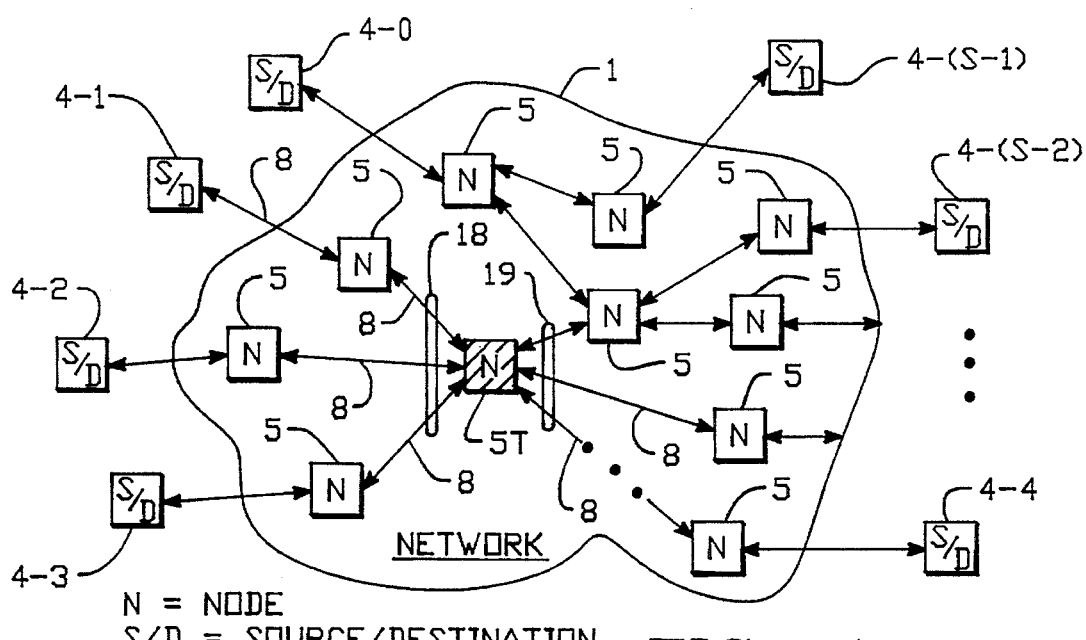
FIG.—1
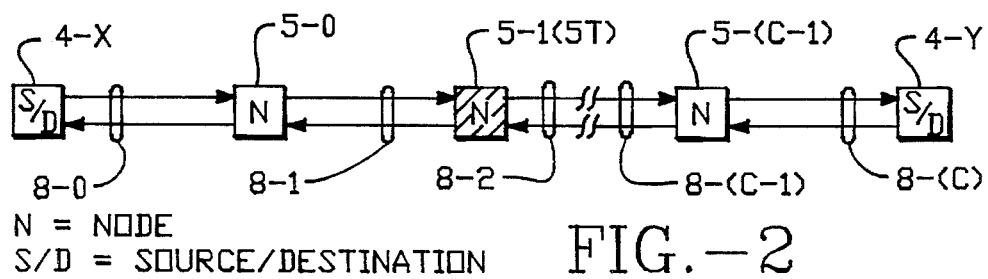
FIG.—2
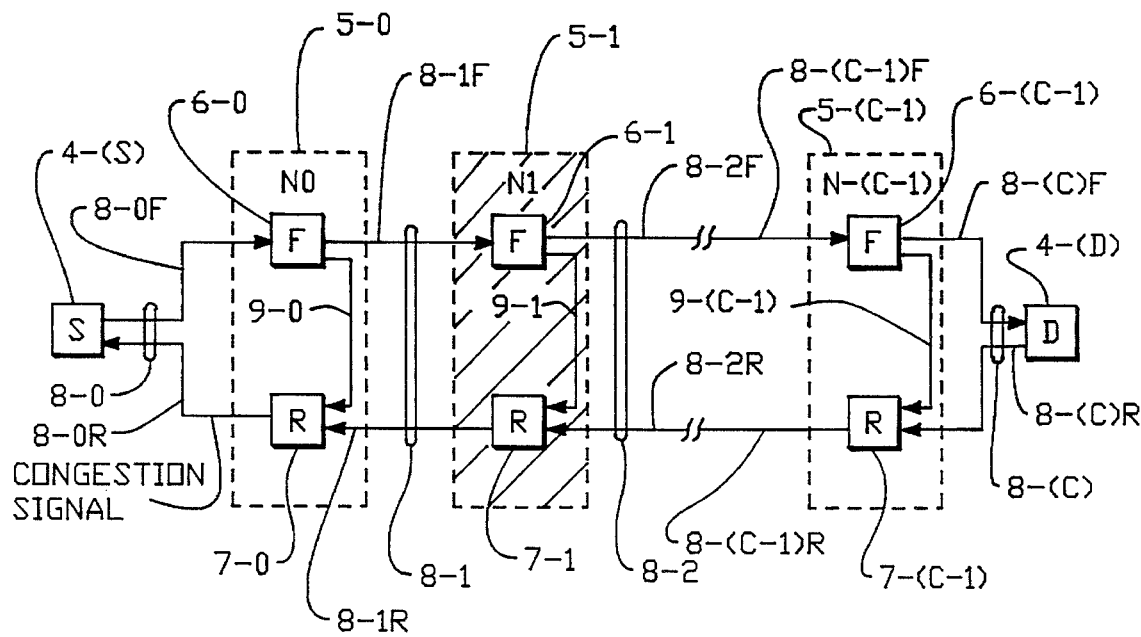
FIG.—3

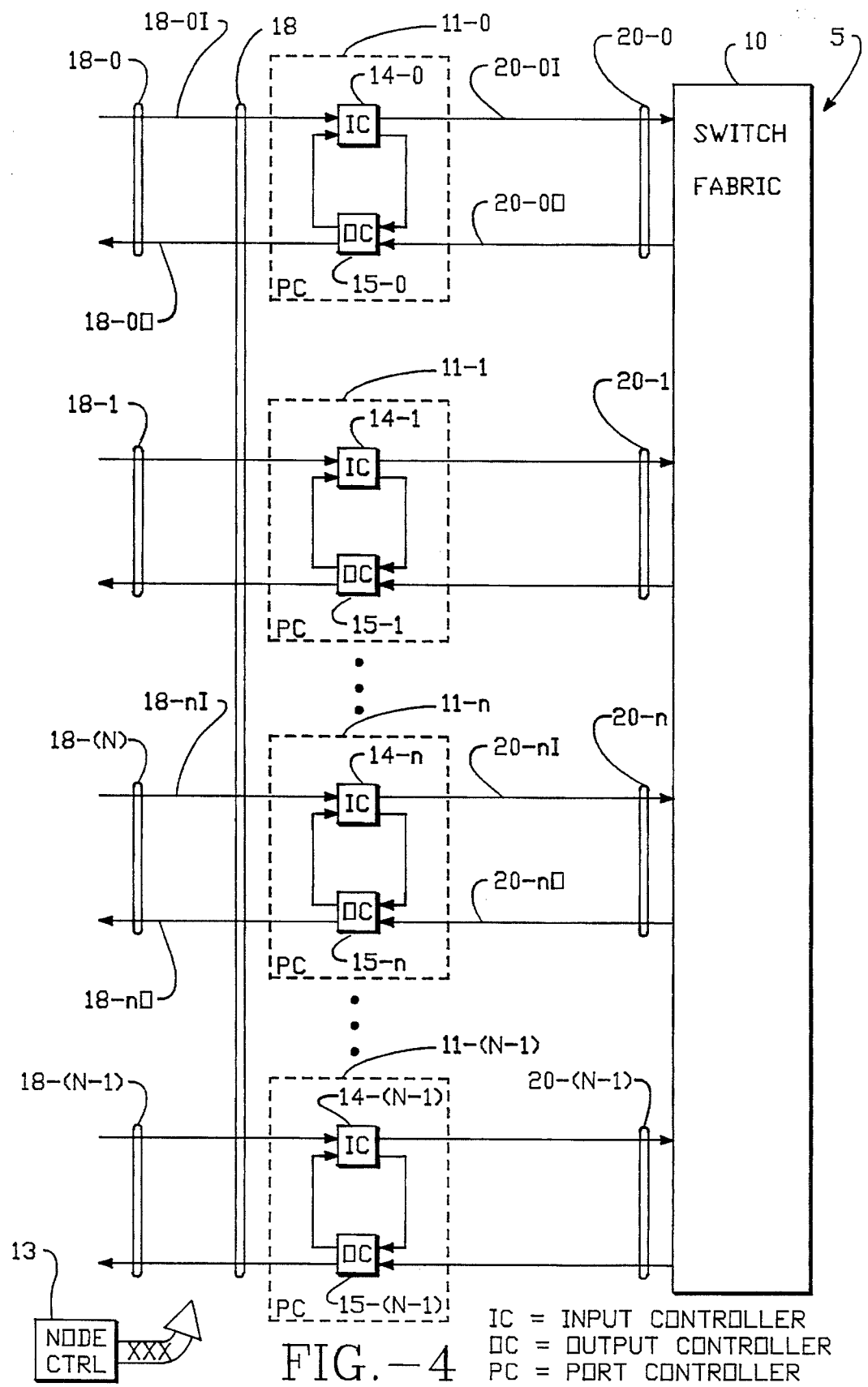
FIG.—4
IC = INPUT CONTROLLER
OC = OUTPUT CONTROLLER
PC = PORT CONTROLLER

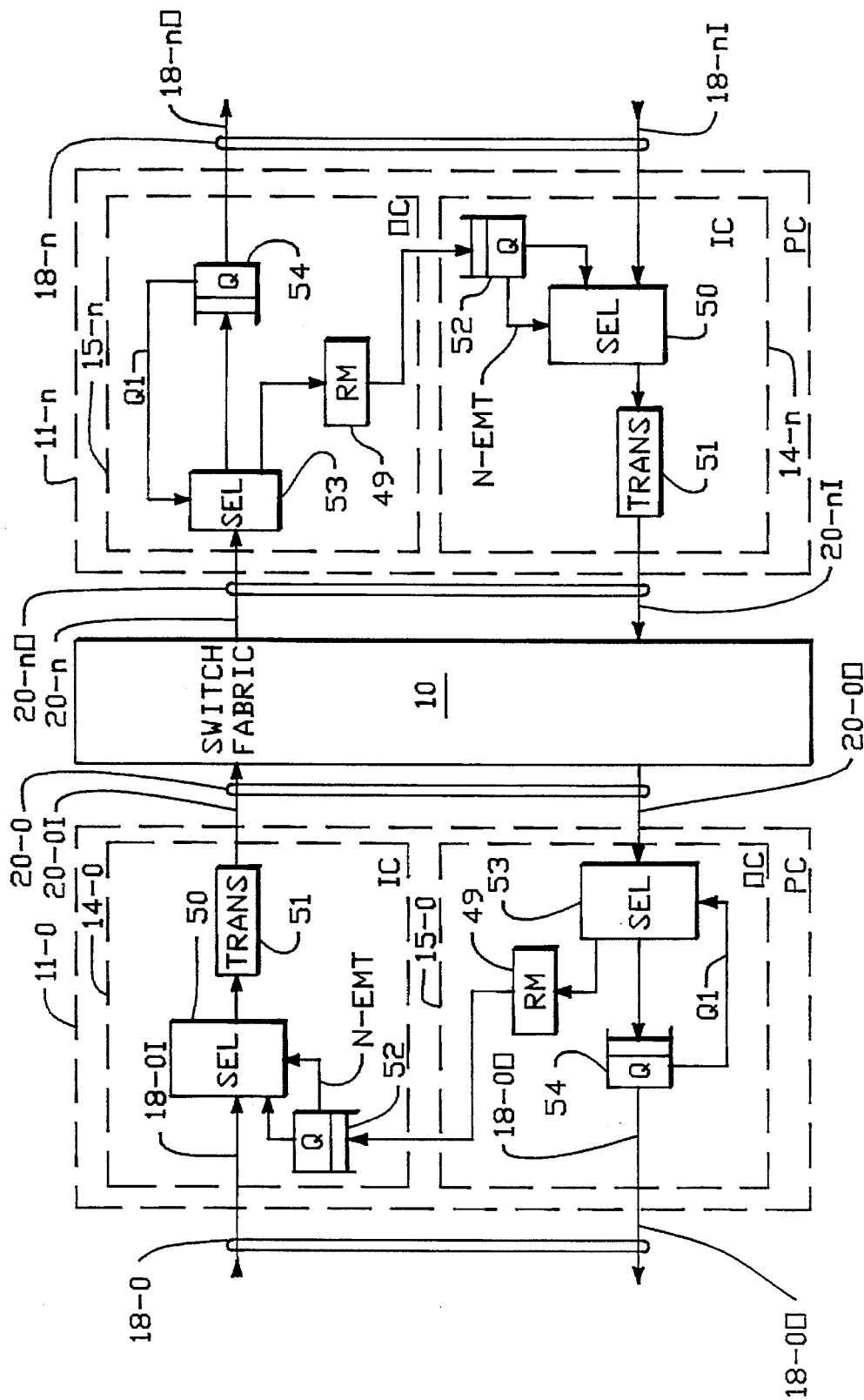

S/D = SOURCE/DESTINATION

FIG.–10

METHOD AND APPARATUS FOR BACKWARD EXPLICIT CONGESTION NOTIFICATION (BECN) IN AN ATM NETWORK

CROSS-REFERENCE TO RELATED APPLICATIONS

U.S. application Ser. No. 07/756,463
Filed: Sep. 9, 1991

Title: METHOD AND APPARATUS FOR REACTIVE CONGESTION CONTROL IN AN ASYNCHRONOUS TRANSFER MODE (ATM) NETWORK U.S. application Ser. No. 07/866,317
Filed: Apr. 9, 1992

Title: CONCURRENT MULTI-CHANNEL SEGMENTATION AND REASSEMBLY PROCESSORS FOR ASYNCHRONOUS TRANSFER MODE (ATM)

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to fast packet communication systems and more particularly to asynchronous transfer mode (ATM) switches in communication networks.

Network communication systems interconnect many users in a network. Each user is connected to the network at a port. The network is formed by the interconnection of many nodes where information input at an input port from one user at a source is passed from node to node through the network to an output port and to another user at a destination. The information transferred from source to destination is packetized and each node switches incoming packets at incoming ports to outgoing packets at outgoing ports. For ATM networks, the packets are further divided into cells.

Fast packet switches may transfer hundreds of thousands of packets per second at every switch port. Each switch port is typically designed to transfer information at a rate from 50 Mbits/s to 600 Mbit/s for a broadband integrated service digital network (ISDN). Switch sizes range from a few ports to thousands of ports.

The term "fast packet switch" includes switches capable of handling both variable length packets and fixed length packets. Fixed-length packets are desirable since they simplify the switch design. Fast packet switches using short, fixed-length packets (cells) are referred to as asynchronous transfer mode (ATM) switches. Fast packet switches handle different types of communications services in a single integrated network where such services may include voice, video and data communications. Since voice and video services can tolerate only a limited amount of delay and delay variance through a network, ATM switches are suitable for such services. The ATM standard for broadband ISDN networks defines a cell having a length of 53 bytes with a header of 5 bytes and data of 48 bytes.

In a typical ATM switch, the cell processing functions are performed within the nodes of a network. Each node is an ATM switch which includes input controllers (IC's), a switch fabric (SF), output controllers (OC's) and a node control (C). The node control is used for functions including connection establishment and release, bandwidth reservation, congestion control, maintenance and network management.

In each switch, the input controllers are typically synchronized so that all cells from input controllers arrive at the switch fabric at the same time and so that cells can be accepted or rejected according to their priority. The traffic through the switch fabric is slotted and the switch fabric delay equals the sum of the timeslot duration, pipeline delay, and the queuing delay.

The node control communicates with the input controllers and the output controllers either by a direct communication path which by-passes the switch fabric or via control cells transmitted through the switch fabric.

External connections to the switch are generally bi-directional. Bidirectional connections are formed by grouping an input controller (IC) and an output controller (OC) together to form a port controller (PC).

The input sequence of cells in a virtual channel is preserved across the switch fabric so that the output sequence of cells on each virtual channel is the same as the input sequence. Cells contain a virtual channel identifier VCI in the cell header which identifies the connection to which the cell belongs. Each incoming VCI identifier in the header of each cell is translated in an input controller to specify the outgoing VCI identifier. This translation is performed in the input controller typically by table look-up using the incoming VCI identifier to address a connection table. This connection table also contains a routing field to specify the output port of the switch fabric to which the connection is routed. Other information may be included in the connection table on a per connection basis such as the priority, class of service, and traffic type of the connection.

In an ATM switch, cell arrivals are not scheduled. In a typical operation, a number of cells may arrive simultaneously at different input ports each requesting the same output port. Operations in which requests exceeding the output capacity of the output port are referred to as output contention (or conflict). Since an output port can only transmit a fixed number (for example, one) cell at a time, only the fixed number of cells can be accepted for transmission so that any other cells routed to that port must either be discarded or must be buffered in a queue.

Different methods are employed for routing cells through a switch module, for example, self-routing and label routing.

A self-routing network operates with an input controller prefixing a routing tag to every cell. Typically, the input controller uses a table lookup from a routing table to obtain the routing tag. The routing tag specifies the output port to which the cell is to be delivered. Each switching element is able to make a fast routing decision by inspecting the routing tag. The self-routing network ensures that each cell will arrive at the required destination regardless of the switch port at which it enters.

A label routing network operates with a label in each cell referencing translation tables in each switching element. The label is translated in each switching element and hence any arbitrary network of switching elements may be employed.

Switches have two principal designs, time-division and space division. In a time-division switch fabric, all cells flow through a single communication channel shared in common by all input and output ports. In a space division switch, a plurality of paths are provided between the input and output ports. These paths operate concurrently so that many cells may be transmitted across the switch fabric at the same time. The total capacity of the switch fabric is thus the product of the bandwidth of each path and the average number of paths that can transmit a cell concurrently.

When the traffic load exceeds the available system resources in a network, congestion is present and performance degrades. When the number of cells is within the carrying capacity of the network, all cells can be delivered so that the number of cells delivered equals the number of cells sent without congestion. However, if cell traffic is increased to the level that nodes cannot handle the traffic, congestion results.

Congestion can be brought about by several factors. If nodes in a network are too slow to perform the various tasks required of them (queuing buffers, updating tables, etc.), queues build up, even though excess line capacity exists. On the other hand, even if nodes are infinitely fast, queues will build up whenever the input traffic rate exceeds the capacity of the output traffic rate for any particular group of outputs.

If a node has no free buffers for queuing cells, the node must discard newly arriving cells. For packet data traffic, when a cell is discarded, the packet from which the discarded cell came will be retransmitted, perhaps many times, further aggravating the congestion.

A difference exists between congestion control and flow control. Congestion control relates to insuring that each part of the network is able to carry the offered traffic. Congestion control is a network-wide consideration involving the behavior and carrying capacity of each part of the network at the time that traffic is offered to each part of the network.

Flow control, in contrast, relates to the point-to-point traffic between a given source and a given destination. Flow control insures that a source does not continually transmit data faster than the destination can receive it. Flow control generally involves direct feedback from the destination to the source to signal the source as to the availability of the destination to receive transmissions from the source.

ATM WAN's And LAN's. Over the last few years, the physical topology of local area networks has migrated from the ring and the multidrop bus toward a star configuration—the hub. A star topology is easier to manage and offers higher reliability. However, the technology remains shared medium, resulting in the "LAN-in-a-box". As the power of the desktop workstation increases, the capacity of the LAN must increase in proportion. Shared medium access in the Gb/s region is significantly more expensive than access in the 100 Mb/s range. Thus pressure is mounting for the high-performance LAN hub to abandon its internal shared medium architecture and adopt a switched architecture.

In addition to the requirement for increasing local area bandwidth is the desire to support multimedia applications. These will require the integration of video, voice, image, and data traffic. There is also a significant requirement to achieve closer interworking between local area and wide area networks. ATM has been proposed as a technology capable of offering high capacity switching and supporting multiservice traffic. It has received much attention in the public wide area network as the future broadband integrated services digital network (B-ISDN). ATM is therefore a clear candidate for the high-performance LAN and campus backbone network.

Traffic Management in an ATM LAN. In a shared medium LAN, be it ting, bus, or backplane, all of the attached stations share a single resource—the shared medium. To transmit, a station contends for access to the shared medium via the medium access (MAC) protocol. If the network is heavily loaded, it will apply backpressure, through the MAC protocol, to stations requesting access. Once a station has successfully gained access to the shared medium, it may transmit its data without fear of causing network congestion since all stations can receive at the data rate of the shared medium. But the bandwidth of the shared medium has now become a bottleneck. In seeking a switched solution, the shared medium is replaced by a switch fabric of greater aggregate capacity than any individual input or output port. In so doing, the MAC protocol is removed, removed the backpressure that the MAC protocol provides is removed, and the network is opened up to the possibility of congestion if too much traffic is directed at any single output port over a short time interval.

A number of schemes have been proposed for traffic management in an ATM network. The most frequently discussed approach is to determine the traffic characteristics of the source and to allocate resources accordingly when the call is admitted to the network. This approach is best suited to traffic sources that can be accurately characterized in advance of transmission, for example, voice and compressed video. Individual data sources are very difficult to characterize in this manner. If a service with the characteristics of a LAN are to be provided, then, at least for data traffic, each source must be permitted to burst at high speed and dynamically share the available capacity between active sources.

Within a LAN or campus network based upon ATM, the propagation delay across the network is low so a simple feedback scheme between the point of congestion and the source may be employed to replace the backpressure mechanism that the MAC protocol provided in a shared medium LAN. Traffic sources with well defined characteristics may be handled by call admission and bandwidth reservation. Such traffic is transmitted at a higher delay priority and is not subject to the backpressure mechanism. The remaining bandwidth is then available to be shared dynamically between those sources that require a LAN-like (best-effort) service. Sources that require this service must be subject to the backpressure mechanism in the same way that sources must conform to the MAC protocol if they wish to attach to a LAN.

Packet Congestion Control Algorithms. Congestion control algorithms for packet switches have included preallocating resources, packet discarding, packet restricting, flow control, and input choking.

The preallocating of resources avoids a congestion problem for virtual channels. When a virtual channel is set up, a call request travels through the network making table entries at each node that control the route to be followed by subsequent traffic. With preallocating, each call request reserves one or more data buffers in each node unless all the buffers are already reserved. If all buffers are reserved, another route is found or a "busy signal" is returned to the source. If buffers are reserved for each virtual channel in each node, there is always a place to store any incoming packet to that node. The problem with preallocation is that substantial buffer resources are allocated to specific virtual channel connections, whether or not there is any traffic over the virtual channel. An inefficient use of resources results because resources not being used by the connection to which they are allocated are nevertheless unavailable to other virtual channels.

With packet discarding, if a packet arrives at a node and there is no place to store it, the node discards it. Congestion is resolved by discarding packets at will. A copy of the packet is kept elsewhere and retransmitted later. Discarding packets at will, if carried too far, results in inefficient operation since the retransmission tends to increase traffic in an already congested network.

Packet restricting limits the number of packets at any location in a network to avoid congestion since congestion only occurs when there is an excessive number of packets at a particular location in the network. Packet restricting is performed in one method by issuing permits. Whenever a node requests sending a packet, the node must first obtain a permit. When the destination finally receives the packet, the permit is again made available for reuse. Although the permit method guarantees that the network as a whole will never become congested, it does not guarantee that a given node will not become swamped with packets. Also, the permit distribution mechanism is difficult to implement without suffering long delays.

Flow control has been used in some networks (for example, ARPANET) in an attempt to eliminate isolated congestion. For example, flow control has been used by the transport layer to keep one host from saturating another host and by one node to prevent that node from saturating its neighbor node. However, flow control has not been effective to solve network-wide congestion.

Input choking has been used to control congestion. Whenever congestion is detected, a choke packet is sent back to the source to choke off input packets. To determine congestion, each newly arriving packet at a node is checked to see if its output line is congested. When congestion is detected at a node, the node sends a choke packet back to the source identifying the destination having congestion. When a source receives a choke packet, the source reduces by some factor the traffic sent to the specified destination. Other packets having the same destination that are already under way generate additional choke packets that are ignored by the source for a first time period. After that first time period has expired, the source looks for more choke packets for a second time period. If during the second time period a choke packet arrives indicating that the line is still congested, the source reduces the flow still more and repeats the process. If no choke packets arrive during a subsequent second time period, the source increases the flow again. The feedback in this protocol tends to prevent congestion but does not throttle flow until congestion is detected.

Several variations on the input choking algorithm have been proposed for packet switches. In one variation, the nodes maintain two congestion thresholds. Above the first threshold but below the second, choke packets are sent back. Above the second threshold, incoming traffic is discarded, it being assumed by the second threshold that the host has received notification of the congestion.

Another input choking variation is to use queue lengths instead of line utilization as the trigger signal for congestion. Another choking variation has nodes propagate congestion information along with routing information, so that the congestion trigger is not based on information from only one node, but on information that somewhere along the path there is congestion. By propagating congestion information in the network, choke packets can be sent at an early time, before too many more packets are under way, thus preventing congestion from building up.

SUMMARY OF THE INVENTION

The present invention is a method and apparatus for reactive congestion control in an asynchronous transfer mode (ATM) network where the network is formed by the interconnection of nodes. Each of the nodes includes a forward path for transfer of information from source to destination through the network and a return path for returning explicit congestion control signals. Each source includes a modifiable issue rate unit which issues forward information signals at different rates for virtual channels in response to the presence and absence of congestion signals received on the return path.

The present invention employs backward explicit congestion notification (BECN). When a queue exceeds a threshold, a request is made to send congestion signals, in the form of (BECN) cells, back to the sources of the virtual channels currently submitting traffic to it. On receipt of a BECN cell on a particular virtual channel, a source reduces it transmission rate for the indicated virtual channel. If no BECN cells are received on a particular virtual channel for a certain period of time, a source may gradually restore its transmission rate. In order to reduce the number of congestion cells, a filter is provided for filtering requests for congestion signals. The filter includes, for example, a store, a filter clock and a gate. The store stores congestion indicators and the store is operative in response to each request to read the store to access any stored congestion indicator and thereafter to store a congestion indicator into the store. The filter clock provides a filter clock signal having a filter period for resetting said congestion indicators in said store. The gate is responsive to the absence of a congestion indicator from the store and to the request to provide the congestion signal. The filter is particularly useful in reducing the number of congestion signals that are returned and thereby increasing the available bandwidth for signals.

In accordance with one feature of the present invention, the cumulative delay for the congestion signal returning from the location where congestion is detected to the source is made small by making the congestion signal processing time at each node much smaller than the return path delay from node to node. In this manner, the return path congestion signal arrives quickly at the source to cause the variable issue rate source to modify the issue rate thereby helping to reduce congestion.

In accordance with one feature of the present invention, the variable issue rate unit has a divide-by-two algorithm for reducing the issue rate in response to receipt of congestion signals. In another feature, the variable rate source has a rate recovery algorithm that increases the issue rate in the absence of congestion control signals after the issue rate has been reduced where the increase is faster for virtual channels at lower rates than for virtual channels at higher rates. This recovery rate difference helps insure fairness among the virtual channels.

In accordance with one aspect of the present invention, each switching element is composed of port controllers which have an input controller and an output controller. In order to minimize the time required for processing return congestion control signals, an input to output controller return path is provided for copying a cell, having a virtual channel identifier, from the forward path to the reverse path without requiring processing cycles to generate the congestion control signal. If the virtual channel identifier has been translated for the cell in the forward direction at a node, the translation is reversed for the reverse path signal so that for any particular link, the same virtual channel identifier is used in the return path as in the forward path. In this manner, processing time is saved so that the congestion signal processing time is much less than the return path delay time between nodes.

In accordance with another embodiment of the present invention, one or more control path buffers are connected in parallel with data buffers whereby congestion control signals are given priority over data signals.

The foregoing and other objects, features and advantages of the invention will be apparent from the following detailed description in conjunction with the drawings.

BRIEF DESCRIPTION OF THE DRAWINGS

FIG. 1 depicts a schematic block diagram of a plurality of source/destination (S/D) users connected through a multinode network.

FIG. 2 depicts a schematic representation of a circuit with one S/D user connected to another S/D user through a sequence of nodes in the network of FIG. 1.

FIG. 3 depicts a schematic representation of the FIG. 2 circuit with a virtual channel connection of the source (S) sending information in a forward direction (F) to a destination (D) and with a reverse direction (R) for transmitting control signals to the source (S).

FIG. 4 depicts a schematic representation of a typical one of the nodes (N) in the FIG. 1 network.

FIG. 5 depicts further details of one embodiment of the typical node of FIG. 4.

FIG. 10 depicts timing diagrams representative of the operation of a network in response to congestion.

DESCRIPTION OF THE PREFERRED EMBODIMENTS

Overall Network - FIG. 1

Figure 6:
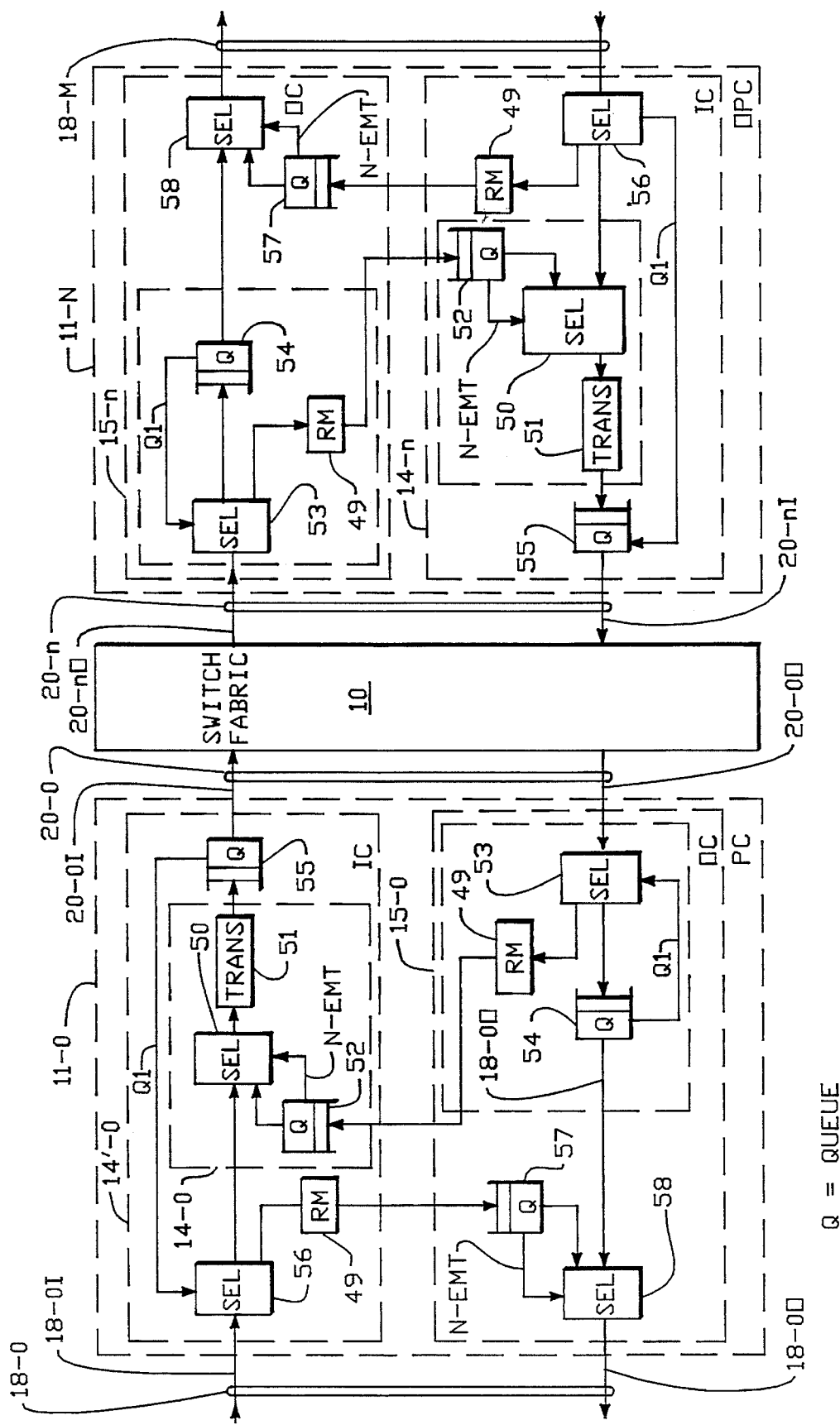
FIG. 6 depicts details of another embodiment of the node of FIG. 4.

In FIG. 1, a plurality of network users are represented as the source/destination (S/D) 4. Each user typically sends information as a source (S) and receive information as a destination (D). The source (S) of an S/D unit 4 will send information to the destination (D) of some other S/D unit 4. In order for information to be transferred from a source to a destination, each S/D unit 4 connects through a multinode (N) network 1. The network 1 includes many nodes (N) 5. The nodes are connected from node to node so that, in general, any particular one of the S/D units 4 can connect to any one of the other S/D units 4 by forming a chain of nodes 5 in the network 1. In general, the connections between the S/D units 4 and a node 5, and the connections between nodes 5, are by bi-directional links 8 which enable information to be transferred in both directions.

In FIG. 1, the number of nodes (N) 5 shown is for clarity a relatively small number, but the network may include hundreds or more nodes. Also, the S/D units 4 include the S users 4-0, 4-1, 4-2, 4-3, 4-4, . . . , 4-(S-2), 4-(S-1). The value of S can be any integer where S is typically equal to hundreds or higher.

In a typical embodiment, the FIG. 1 communication system is an ATM network in which the unit of transfer of information is a cell. A plurality of cells form packets of information. The network 1 communicates cells and packets so as to support different types of information including images, voice and data.

Virtual channel - FIG. 2

In FIG. 2, the S/D unit 4-x connects through a plurality C of nodes (N) 5-0, 5-1, . . . , 5-(C-1) to the S/D unit 4-y.

In FIG. 2, the S/D unit 4-x is typical of any of the S/D units 4 of FIG. 1. For example, the S/D unit 4-x may represent the S/D unit 4-2 in FIG. 1. Similarly, the S/D unit 4-y in FIG. 2 may represent any of the S/D units 4 in FIG. 1. For example, S/D unit 4-y may represent the S/D unit 4-4 in FIG. 1. In such an example, the nodes 5-0, 5-1, . . . , 5-(C-1) represent the C nodes in the network 1 of FIG. 1 which are used to connect the S/D unit 4-2 to the S/D unit 4-4.

In FIG. 2, the bi-directional links 8-0, 8-1, . . . , 8-(C-1), 8-(C) connect from the S/D unit 4-x through the nodes 5-0, 5-1, . . . , 5-(C-1 ) to the S/D unit 4-y.

In FIG. 2, information may be transferred from the source (S) in the S/D unit 4-x to the destination (D) in the S/D unit 4-y. Similarly, information from the source (S) in the S/D unit 4-y can be transferred to the destination (D) in the S/D unit 4-x. While information may be transferred in either direction in FIG. 2, it is convenient, for purposes of explanation to consider transfers between a source (S) and a destination (D) whether that be from the S/D unit 4-x to the S/D unit 4-y or from the S/D unit 4-y to the S/D unit 4-x. Regardless of the direction, each transfer is from a source (S) to a destination (D).

S to D Transfers - FIG. 3

In FIG. 3, a schematic representation of the circuitry used for a source (S) to destination (D) transfer in the virtual channel of FIG. 2 is shown. In FIG. 3, the source unit 4-(S) in the S/D unit 4-x of FIG. 2 connects to the destination unit 4-(D) in the S/D unit 4-y of FIG. 2.

In FIG. 3, each of the links 8-0, 8-1, . . . , 8-(C-1), 8-(C) includes a forward (F) channel for transferring information in the forward direction and a reverse (R) channel for transferring information in the reverse direction. The reverse channel in FIG. 3 is associated with the transfer of information from the source unit 4-(S) to the destination unit 4-(D). The reverse channel in FIG. 3 is for the purpose of sending control information used in connection with congestion control within the network of FIG. 1. The reverse channel (R) is distinguished from the forward channel (F) used for the transfer of information in the forward direction from S/D unit 4-y to S/D unit 4-x, as discussed in connection with FIG. 2. Both the forward (F) and the reverse (R) channels are associated with the source unit 4-(S) transfer to the destination unit 4-(D). Each of the nodes in FIG. 3 includes forward (F) circuitry 6 and reverse (R) circuitry 7. In FIG. 3, the forward channels 8-0F, 8-1F, . . . , 8-(C-1)F connect as inputs respectively to the forward circuits 6-0, 6-1, . . . , 6-(C-1). The forward channel 8-(C)F connects from the node 6-(C-1) to the D unit 4-(D). Similarly, the reverse channels 8-0R, 8-1R, . . . , 8-(C-1)R connect from the reverse circuits 7-0, 7-1, . . . , 7-(C-1). The reverse channel 8-(C)R connects from the D unit 4-(D) to the reverse circuit 7-(C-1).

In FIG. 3, each of the nodes 5 has a feedback connection 9 connecting from the forward (F) circuit 6 to the reverse (R) circuit 7. Specifically, the feedback channels 9-0, 9-1, ..., 9-(C-1) connect from the forward (F) circuits 6 to the reverse (R) circuits 7 in the nodes 5-0, 5-1, ..., 5-(C-1), respectively. In the FIG. 3 circuit, a virtual channel connection is made along the forward channel setting up a communication path in the forward direction between the S unit 4-(S) and the D unit 4-(D). Because other virtual channels are also established in the network 1 of FIG. 1, congestion may arise at any node or destination including the nodes of FIG. 3. The feedback channels 9 are utilized to send back an explicit congestion signal using the reverse (R) channels 8-()R and reverse circuits 7. When the source (S) unit 4-(S) receives an explicit congestion signal on the reverse channel 8-0R, source unit 4-(S) takes corrective action to reduce the congestion in the network. Specifically, in accordance with the present invention, source unit 4-(S) reduces the rate at which data is inserted over the forward channel through channel 8-0F from the assigned rate (Maximum Channel Peak Cell Rate) to some lower rate (Current Channel Peak Cell Rate). After a time period such that congestion is likely to have cleared, the source unit restores the insertion rate of information in the forward channel over the bus 8-0F to its original maximum rate.

Since the FIG. 3 virtual channel is typical of all of the virtual channels established in the network of FIG. 1, the combined operation of all the virtual channels in an ATM system is to dynamically control the insertion rate of input information, and specifically to reduce the insertion rate in the presence of congestion in the network and to increase the insertion rate in the absence of congestion in the network.

Each virtual channel, like the FIG. 3 virtual channel, in the FIG. 1 network functions with a feedback control for controlling the insertion rate of information into the network. In order for the feedback control 3 to have a good response time, the delay in time from the detection of congestion until the source unit takes corrective action should be small. In general, the feedback delay value has two basic components. The first component of delay is the circuit path delay for each node to node transfer required from the point of congestion back to the source. The second component of the delay is the delay signal processing time required in each node and in each reverse circuit 7 in order to transmit the explicit congestion signal through the node. The total feedback delay is, therefore, the sum of the node-to-node reverse signal transfer times and the sum of the reverse signal processing times. For any given system, the reverse signal transfer time from node to node is not readily changed and is substantially fixed for any particular system. The present invention causes the reverse signal processing time to be much less than the reverse signal transfer time. Therefore, substantially all of the feedback delay is a result of the reverse signal transfer time and the feedback processing time is small or negligible.

Simple Node Embodiment - FIG. 4

In FIG. 4, one typical embodiment of a node having the feedback control reverse signal paths of FIG. 3 is shown. In FIG. 4, the node 5 includes N links 18-0, 18-1, ..., 18-n, ..., 18-(N-1). Each of the links 18 of FIG. 4 are analogous to the bi-directional links 8 of FIG. 2.

In FIG. 4, the links 18-0, 18-1, ..., 18-n, ..., 18-(N-1) connect to port controllers 11-0, 11-1, ..., 11-n, ..., 11-(N-1).

The node of FIG. 4 is used in connection with the information transfer of FIG. 3, for example, by having one of the links 18, for example, input link 18-0 in FIG. 4, connect through switch fabric 10 to another one of the links 18, for example, link 18-n. In the example described, the switch fabric 10 functions to connect the link 18-0 to the link 18-n.

In an example where the node of FIG. 4 represents the node 5-1 in FIG. 2, the link 8-1 in FIG. 2 is the link 18-0 in FIG. 4 and the link 8-2 in FIG. 2 is the link 18-n in FIG. 4.

With such a connection, the node of FIG. 4 connects information in one direction, for example, from link 18-0 to link 18-n, and connects information in the opposite direction from the link 18-n to the link 18-0. The links 18-0 and 18-n were arbitrarily selected for purposes of explanation. Any of the N links 18 might have been selected in the FIG. 2 circuit for connection to any of the other links 18.

When the node of FIG. 4 is used in the virtual channel connection of FIG. 3 with the source (S) on the left and the destination (D) on the right, then for purposes of explanation it is assumed that the link 18-0 is an input to the node 5 in the forward direction and the link 18-n is output from the node in the forward direction.

In FIG. 4, port controllers (PC) 11-0, 11-1, ..., 11-n, ..., 11-(N-1) have input controllers 14-0, 14-1, ..., 14-n, ..., 14-(N-1), respectively and have output controllers (OC) 15-0, 15-1, ..., 15-n, ..., 15-(N-1), respectively. In FIG. 4, forward information cells from the source 4-S of FIG. 3 sent to the destination 4-(D) of FIG. 3 connect from the bus 18-0I through the input controller 14-0 to the bus 20-nO through the switch fabric 10 to the bus 20-nI through the output controller 15-n to the bus 18-nO. If congestion is detected at the node 5, then an explicit congestion signal is connected, for example, from the output controller 15-n to the input controller 14-n to the bus 20-nI back through the switch fabric 10 to the bus 20-OO to the output controller 15-0 to the output bus 18-0O.

FIG. 5

In FIG. 5, a more detailed embodiment of the node of FIG. 4 is shown. In FIG. 5, the port controller 11-0 is shown typical of all of the port controllers 11 of FIG. 4. Similarly, the port controller 11-n is typical of all of the port controllers 11 of FIG. 4. In FIG. 4, the port controller 11-n is identical to the port controller 11-0 except that the images in port controller 11-n are flipped about 180° in order to provide symmetry in the drawing. As indicated in connection with FIG. 4, in the virtual channel of FIG. 3, the controller 11-0 of FIG. 5 serves as an input for forward going cells while the controller 11-n functions as an output for forward going cells.

In FIG. 5, the port controllers 11-0 and 11-n include input controllers (IC) 14-0 and 14-n each having a selector 50, a translator 51 and a reverse signal queue 52. The port controllers 11-0 and 11-n also include an output controller (OC) 15-0 and 15-n each having a selector (SEL) 53, a queue (Q) 54 and a reverse marker (RM) 49.

The operation of the FIG. 5 node in connection with the virtual channel of FIG. 3 is as follows. Forward transmitted cells appear on the bus 18-0I input to the selector 50 of the input controller 14-0. Selector 50 normally is set to select the input bus 18-0I unless the reverse queue 52 has congestion control information which must be returned in connection with the operation of some other virtual channel. If the not empty (N-EMT) signal is asserted indicating that congestion information is stored in the queue 52, selector 50 selects the output from queue 52 but otherwise selects the forward cells on bus 18-0I.

The translator 51 for each cell translates the value of the incoming virtual channel identifier (VCI) for the cell to an outgoing VCI for the cell, directs the cell to an outgoing link, and marks the priority of the cell. For example, the translator is implemented as a table storing values where the table is addressed by the incoming VCI.

The cell information together with the translated VCL appear on the bus 20-nO to the switch 53 in the output controller 15-n. Selector 53 normally selects the bus 20-nO for connection to the queue 54 unless queue 54 is filled beyond a threshold as indicated by the Q1 signal. If the Q1 signal is asserted, selector 53 connects the VCI and control information to the queue 52 through the reverse marker unit 49. Reverse marker unit 49 marks the VCI label with a reverse signal indication so that reverse signals can be distinguished from forward signals.

The threshold signal Q1 indicating the fullness of queue 54 is a congestion signal that is transmitted back to the source 4-(S) of FIG. 3. If queue 52 has any information stored, it issues the N-EMT signal indicating a not empty condition to the selector 50 in the input controller 14-n. Selector 50 connects its output to the translator 51. Translator 51 translates the return signal VCI back to the original value (which appeared on the input bus 18-0I) so that switch fabric 10 receives the return path congestion signal on the bus 20-0O input to the selector 53. Selector 53, assuming that the queue 54 is not full, connects the return signal to the queue 54 for output on the return bus 18-0O. Accordingly, the translator 51 in the input controller 14-n reverses the translation done in the translator 51 in the input controller 14-0.

FIG. 6

In FIG. 6, an alternate embodiment of the FIG. 5 node is shown. In FIG. 6, the input controllers 14-0 and 14-n are the same as in FIG. 5. Similarly, the output controllers 15-0 and 15-n are the same as in FIG. 5. In FIG. 6, the input controllers 14'-0 and 14'-n are expanded to include a selector 56, a queue 55 and a reverse marker unit 49. Similarly, the expanded output controllers 15'-0 and 15'-n are expanded to include a bypass queue 57 and a selector 58.

In operation of the FIG. 6 node, selector 56 normally is operative to connect the input on forward bus 18-0I to the selector 50 unless information in the queue 55 exceeds the fullness threshold as indicated by a Q1 signal. In the case of Q1, selector 56 sends the forward cell to marker unit 49 which marks the forward cell as a reverse cell and sends the cell in the reverse direction by placement in the queue 57. In this manner the reverse signal is selected by selector 58 for return on the reverse channel 18-0O. Note that this reverse signal requires no translation since the return occurs before the translation in translator 51. The selector 58 gives priority to return signals in the queue 57 over the reverse or forward path signals in the queue 54.

FIG. 7

Figure 7:
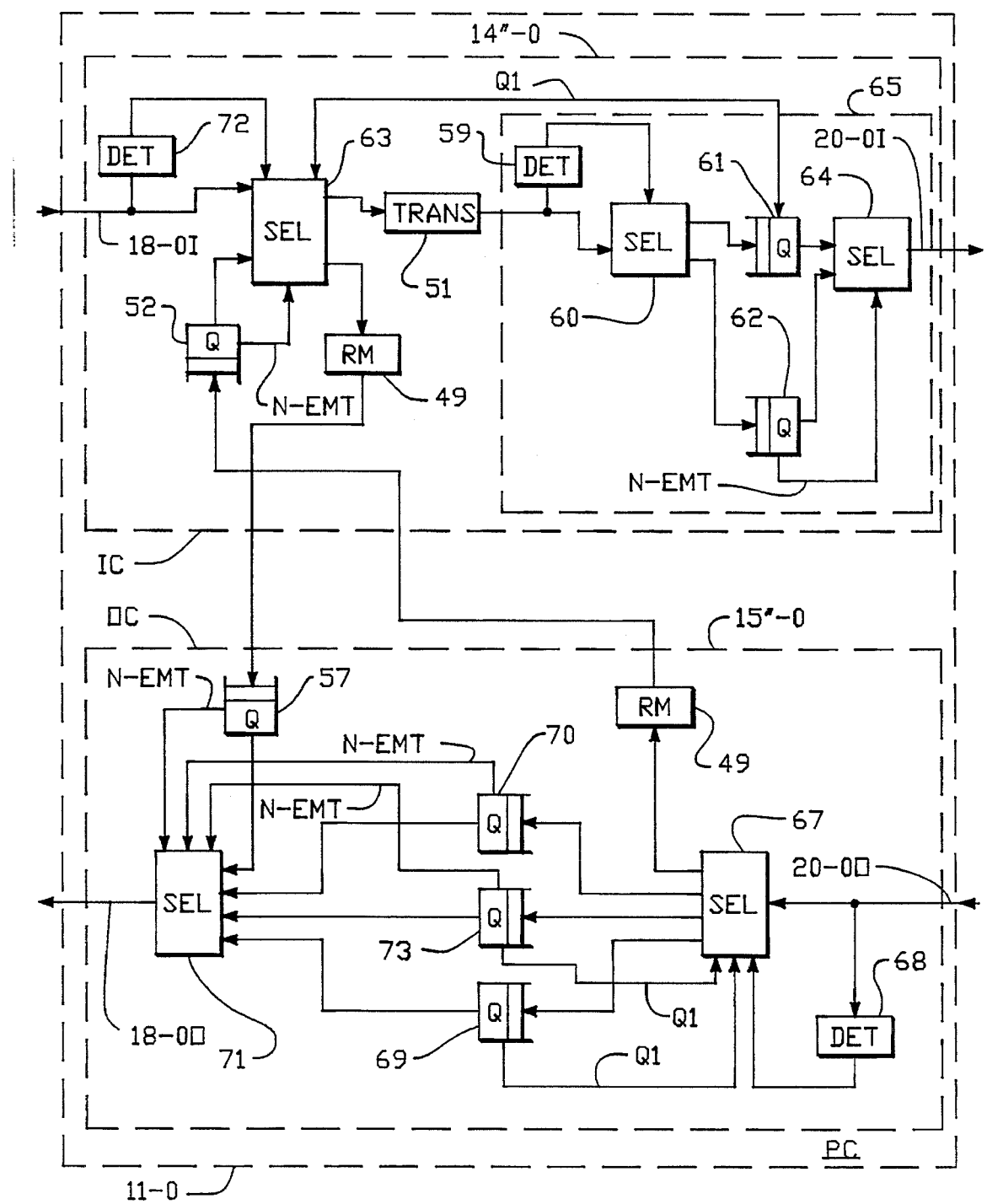
FIG. 7 depicts details of still another embodiment of the node of the FIG. 4.

In FIG. 7, an alternate embodiment of the port controller structure for the nodes of FIGS. 2 through 6 is shown. In FIG. 7, the forward information cells appear on input bus 18-0I which are input to the selector 63. A detector 72 detects the input cells on bus 18-0I to determine if any of the cells are reverse cells signalling congestion in the network.

If the signal on 18-0I is a reverse signal detected by detector 72, selector 63 has priority over any Q1 signal from the queue 61 and sends the reverse signal through translator 51 to selector 60.

Selector 63 also selects the output of the reverse queue 52 whenever the not empty signal N-EMT is present. Whenever the information on bus 18-0I is forward cells, selector 63 forwards them the to the translator 51 unless the queue 61 issues a Q1 signal in which case selector 63 sends the forward cells to marker unit 49 which marks them as reverse cells and sends them to the queue 57. Selector 63 determines priority between reverse cells on input bus 18-0I and reverse queue 52. In either case, selector 63 ignores any Q1 signal from the queue 61 and forwards the reverse signals to selector 60. Detector 59 detects the presence of reverse cells and causes selector 60 to forward the reverse cells to the reverse queue 62. Reverse queue 62 is in parallel with the forward queue 61. When forward cells from bus 18-0I through selector 63 and translator 61 appear at switch 60, switch 60 connects them as an input to the forward queue 61. The outputs from queues 61 and 62 connect as inputs to the selector 64. Selector 64 selects the forward cells from the queue 61 unless the reverse queue 62 issues a not empty signal N-EMT.

In FIG. 7, the output controller 15"-0 includes the reverse queue 57, a reverse queue 70, a forward queue 73 and a forward queue 69. Detector 68 detects reverse cells on bus 20-0O which may carry either forward or reverse cells. Reverse cells are detected by detector 68 which provides an input to selector 67. If the cells on bus 20-0O are forward cells of high priority, selector 67 causes the forward cells to be stored into the queue 73 unless queue 73 is full. Queue 73 provides a not empty signal, N-EMT, to be issued to the selector 71 and a fullness level signal, Q1, to the selector 67. If the cells on bus 20-0O are forward cells and the forward queue 69 or 73 issues a Q1 signal, selector 67 causes the forward cells to send a congestion signal through marker unit 49 to the reverse queue 52 in the input controller 14"-0. If the cells on bus 20-0O are forward cells of lower priority and the forward queue 69 does not issue a Q1 signal, the forward cells are stored into the queue 69. If detector 68 detects reverse cells on the bus 20-0O, selector 67 directs the reverse signals into the reverse queue 70 which is in parallel with the forward queues 69 and 73. A not empty signal from the queue 70 is input to the selector 71. Selector 71 receives the not empty control signals from the reverse queues 57, 70, and 73. The presence of a not empty signal from queues 57, 70 or 73 causes switch 71 to grant priority to the reverse signal. Priority can be granted to the queue 57, to the queue 70 or to the queue 73. In the absence of any signals into queues 57, 70 and 73, the forward queue 69 is connected by selector 71 as the output on bus 18-0O.

FIG. 7 depicts one port controller which, as indicated in connection with FIG. 4, is associated with other port controllers on the switch fabric to form a node in the manner previously described.

Figure 8:
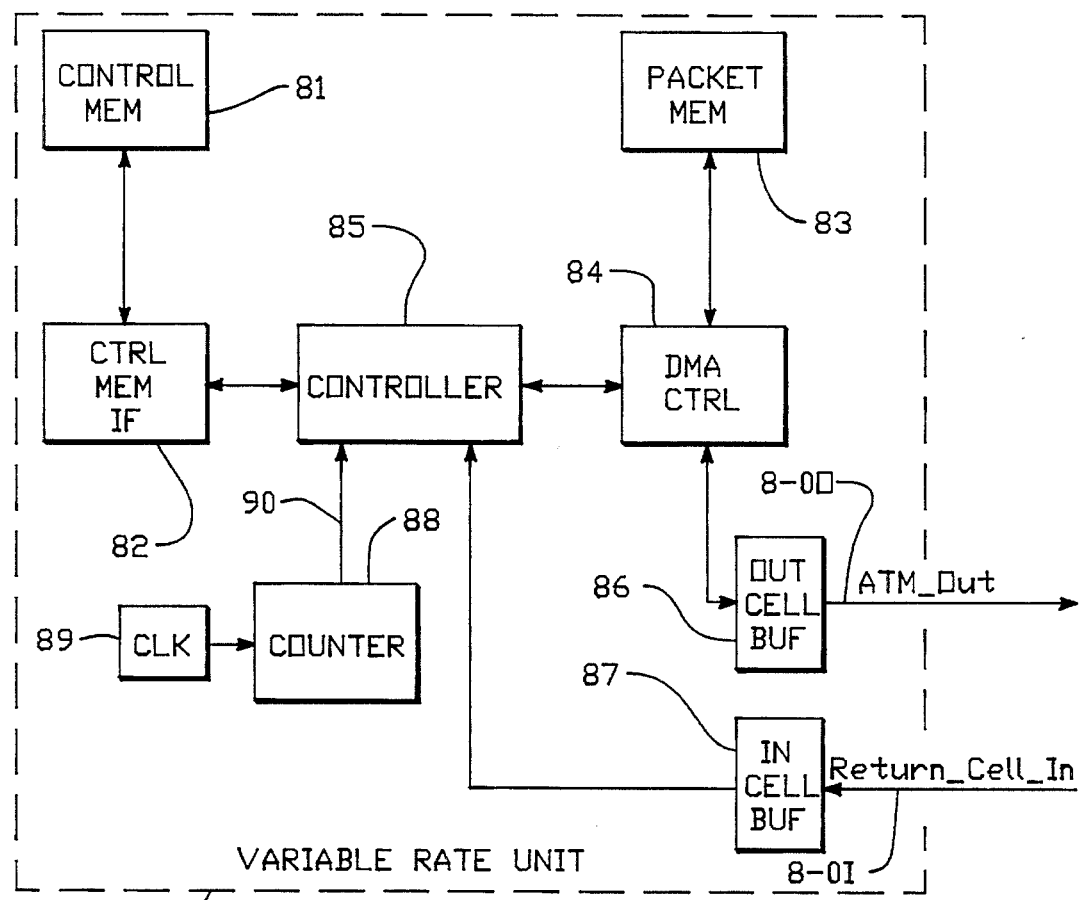
FIG. 8 depicts a schematic block diagram of a variable rate unit used within the sources of FIG. 1.

Variable Rate Unit - FIG. 8

In FIG. 8, a variable rate unit 80 is shown which forms part of each source, for example, source 4-(S) in FIG. 3. The variable rate unit 80 upon receipt of a return cell signal, Return_Cell_In, on the reverse path 8-0O stores that signal as an explicit congestion signal in an input cell buffer 87. The cell buffer 87 provides that congestion signal to the controller 85. The Return_Cell_In signal includes a return cell which has a return indicator, for indicating that the cell is a return cell, and which has a pointer for pointing to a virtual channel identifier, Cong_Signal_VCI, which identifies the virtual channel which has experienced congestion.

The variable rate unit 80 includes a packet memory 83 and a direct memory access (DMA) control 84. During normal operation, the DMA control 84 obtains cells from the packets in packet memory 83 and outputs those cells to the cell buffer 86 for transmission in the forward direction on the forward bus 8-OO. The output rate on the bus 8-OO from the DMA controller 84 will normally be at the maximum cell rate for each virtual channel in the absence of a return cell indicating congestion received back on the bus 8-OO.

The variable rate unit 80 of FIG. 8 also includes a control memory 81 and a control memory interface 82. Control memory 81 stores control information about each virtual channel that is active to send information from packet memory 83 to the output channel 8-OO. The control information storm for each channel includes a congestion level value, Cong_Level, indicating the level of the reduced rate of transmission due to congestion on the virtual channel. The control information stored for each channel includes a recovery rate value, RC_Mode, indicating the rate of recovery of transmission rate after the rate has been reduced due to congestion on the virtual channel. The control information stored for each channel includes a counter field, Recovery_Count, for counting cells during congestion periods and a control field, RC_Inhibit, for controlling changes in rate during congestion periods.

Controller 85 accesses the control memory 81 through the memory interface 82 for each cell for every virtual channel being transmitted by the DMA controller 84. Upon receipt of a congestion signal, controller 85 modifies the control rate in the control memory 81 for that virtual channel and modifies the transmission rate used by the DMA controller 84 for that particular channel. In accord with specific algorithms, after the congestion signals are no longer existing for a particular virtual channel, the controller 85 again modifies the rate of transmitting the information for the virtual channel which was previously having congestion.

The apparatus for and the methods of operation of source units having packet memories and DMA controllers are well known. The modification of such sources is explained with reference to a number of temps used in connection with the variable rate unit 80 of FIG. 8 operating with a variable rate control algorithm.

Terms For Automatic Rate Control Algorithm

"Virt Chan" identifies one of a number of virtual channels, where each virtual channel transmits ATM cells at a selected one of a number of Xmit_Rate rates unless, in response to an explicit congestion signal for that virtual channel, the transmission rate is modified by a congestion rate modification value, Cong_Level.

"Rate_Queue" is a list of virtual channel identifiers that identify virtual channels that are to be transmitted at a particular rate.

"Xmit Rate" defines a number of transmission rates where each Xmit Rate is the rate to transmit cells used by all of the virtual channels in a Rate_Queue.

"Xcount" defines a number of 4-bit counts, one for each Rate_Queue, where each Xcount for the corresponding Rate_Queue is incremented to count the cell transmission times at the full Xmit_Rate rate for that corresponding Rate_Queue.

"Xmit_Time" defines a number of state bits, one for each Rate_Queue, where each Xmit_Time state bit indicates when it is time to service the corresponding Rate_Queue. Each Xmit Time state bit is set to the active state each time the Xcount is incremented for the corresponding Rate_Queue.

"Cong_Level" defines a number of 3-bit congestion level values, one for each virtual channel, where each value for the corresponding virtual channel is used to reduce the transmission rate of that corresponding virtual channel below the normal non-reduced Rate_Queue rate.

"RC_Mode" defines a number of 3-bit exponents, one for each virtual channel, where each exponent for the corresponding virtual channel is used to control the rate of restoring the transmission rate of that corresponding virtual channel back to the normal Rate_Queue rate after the transmission rate of that virtual channel has been reduced because of congestion. The rate of restoring is determined by a Recovery_Value=$2^{RC\_Mode}$.

"RC_Inhibit" defines a number of state bits, one for each virtual channel, where each RC_Inhibit state bit for the corresponding virtual channel is used to inhibit changes in Cong_Level during a period existing after a change in Cong_Level for that corresponding virtual channel and before a cell has been transmitted over that corresponding virtual channel.

"Recovery_Count" defines a number of 4-bit count values, one for each virtual channel, where each Recovery_Count value for the corresponding virtual channel is used for counting transmitted cells for that corresponding virtual channel as measured from the time that the last Cong_Signal was detected for that virtual channel. Recovery_Count is compared with Recovery_Value for the corresponding virtual channel to control restoring the transmission rate of cells for that corresponding virtual channel. When Recovery_Count equals Recovery_Value for the corresponding virtual channel, Cong_Level is incremented to thereby increase the transmission rate for the corresponding virtual channel.

"Cong_Signal" indicates the presence of one or more Cong_Signal_VCI identifiers stored in a queue for processing where the presence of Cong_Signal is used to trigger decrementing of the transmission rate of cells for the virtual channels identified by the Cong_Signal_VCI identifiers in the queue.

"Cong_Signal_VCI" are virtual channel identifiers, one for each virtual channel on which a cell has been returned to indicate congestion.

"Pkt_Loss_Signal" indicates the presence of one or more Pkt_Loss_VCI identifiers stored in a queue for processing where the presence of Pkt_Loss_Signal is used to trigger decrementing of the transmission rate of cells for the virtual channels identified by the Pkt_Loss_VCI identifiers in the queue.

"Pkt Loss VCI" are virtual channel identifiers, one for each virtual channel on which the loss of cells has occurred and has been interpreted as an indication of congestion.

Counter

In FIG. 8, the counter 88 is clocked by the clock unit 89 to provide timing for the variable rate unit 80. The controller 85 selects from among the parallel outputs 90 from counter 88 to provide clock signals that establish different transmission rates, Xmit_Rate, one for each Rate_Queue, for transmitting cells over the virtual channels in that Rate_Queue.

A number of different rates can be established and in one embodiment, Q rates Xmit_Rate$_0$, Xmit_Rate$_1$, ..., Xmit_Rate$_{Q-1}$ are established from counter 88. Each one of the Q Xmit_Rates is associated with a 4-bit Xcount which is incremented as a counter by the corresponding Xmit_Rate. Accordingly, the Xcount$_0$, Xcount$_1$, ..., Xcount$_{Q-1}$ counts are incremented by Xmit_Rate$_0$, Xmit_Rate$_1$, ..., Xmit_Rate$_{Q-1}$ rates, respectively.

Each of the Q Xmit_Rates is associated with a corresponding queue, Rate_Queue, for storing virtual channel identifiers that identify virtual channels that have cells to be transmitted at the Xmit_Rate of the corresponding Rate_Queue. Accordingly, for uncongested normal operation, the virtual channels having identifiers stored in the Rate_Queue$_0$, Rate_Queue$_1$, ..., Rate_Queue$_{Q-1}$ queues are serviced for transmitting cells over virtual channels at the Xmit_Rate$_0$, Xmit_Rate$_1$, ..., Xmit_Rate$_{Q-1}$ rates, respectively.

Each of the Q Xmit_Rates and the corresponding Q Rate_Queues is associated in controller 85 with a state bit, Xmit_Time, for indicating when it is time to service the Rate_Queue. Accordingly, for uncongested normal operation, the Rate_Queue$_0$, Rate_Queue$_1$, ..., Rate_Queue$_{Q-1}$ queues are serviced whenever the corresponding Xmit_Time$_0$, Xmit_Time$_1$, ..., Xmit_Time$_{Q-1}$ state bits are set, respectively. Each Xmit Time state bit is set to the active state each time the Xcount is incremented for the corresponding Rate_Queue.

Variable Rate Unit Controller

In FIG. 8, the variable rate unit controller 80 is constructed with conventional logic circuits which implement an automatic rate control algorithm. Although the logical functions can also be performed by programmed processors, such programmed processors are generally too slow for high speed operations required for ATM systems. The operation of the controller 85 and the variable rate unit of FIG. 8 are described in connection with the following Table 1, Table 2, and Table 3.

Table 1 defines the parameter values for the automatic rate control algorithm. Table 2 defines the automatic rate control algorithm using pseudo code. Table 3 represents a sequenced operation of the variable rate control unit 85 of FIG. 8 operating in accordance with the Table 2 automatic rate control algorithm. Table 3 depicts a sequenced execution for a typical one of the Rate_Queues, Rate_Queue$_1$, and for a typical one of the virtual channels, Virt_Chan$_1$.

Figure 10:
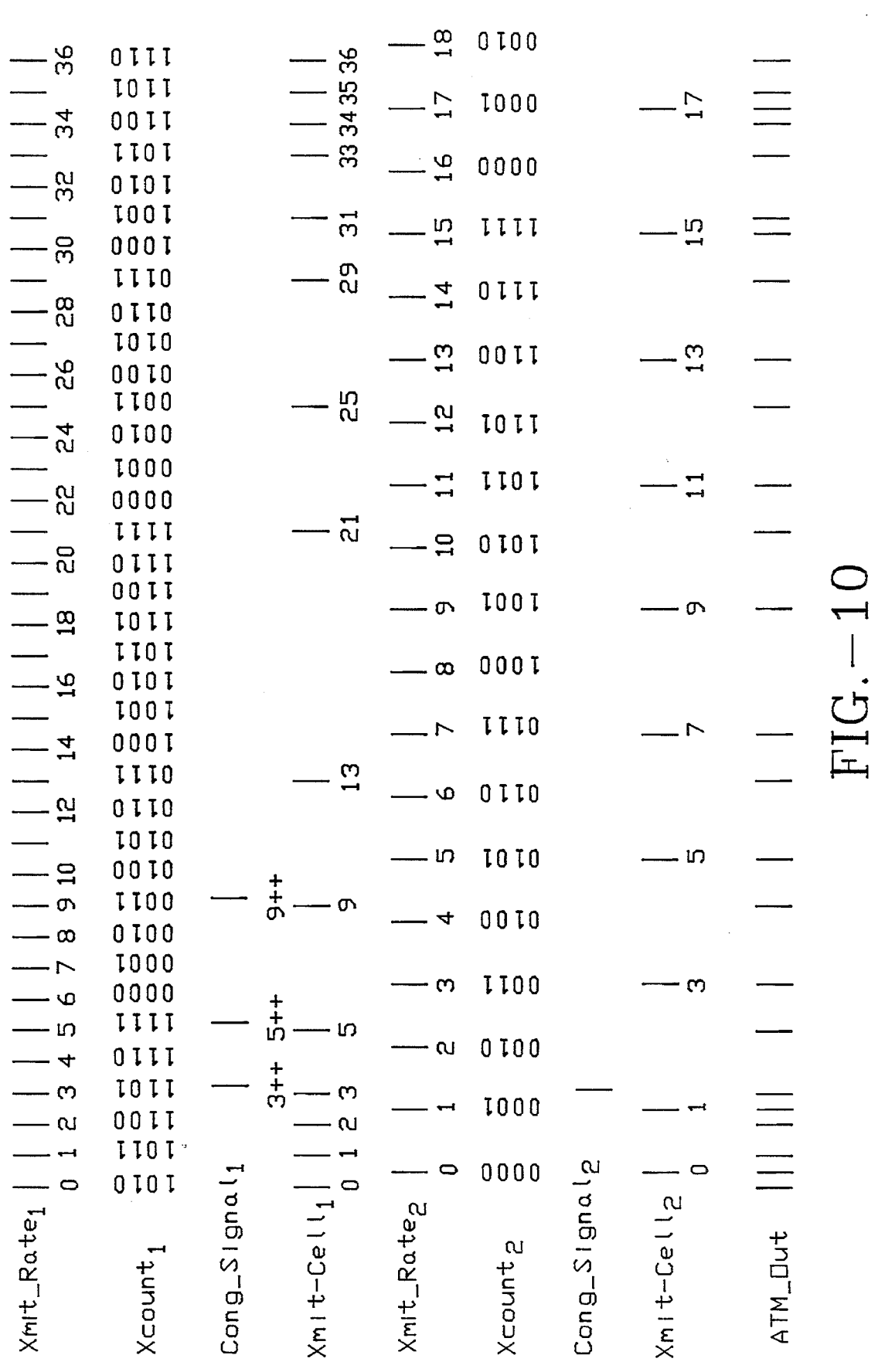

The operation of the variable rate unit 80 with the Table 3 example is further described in connection with FIG. 10. The times when Xmit_Time$_1$ are active for Xmit_Rate$_1$ are shown in FIG. 10 as times XR$_1$0, XR$_1$1, XR$_1$2, XR$_1$3, and so on. For purposes of explanation, it was assumed that after transmitting cells by virtual channel 1 with Xmit_Cell$_1$ at XR$_1$0, XR$_1$1, XR$_1$2, and XR$_1$3, an explicit congestion signal Cong_$_{Signal1}$ was returned at XR$_1$3+ so that no cell was transmitted at XR$_1$4 due to a decrease in the transmission rate. The operation of the Table 3 example continues thereafter in FIG. 10 both to further decrease the transmission rate and to thereafter recover the rate when congestion stops after XR$_1$9+.

FIG. 10 also depicts another virtual channel transmitting at another rate, Xmit_Rate$_2$, which is at one half the rate of Xmit_Rate$_1$. One congestion signal, Cong_Signal$_2$, is received at XR$_1$1+ causing the cell transmission of Xmit_Cell$_2$ to be at one half the Xmit_Rate$_2$ rate. For clarity, recovery has been assumed to be disabled (RC_Mode=101-Disable_Recovery) for this virtual channel.

In FIG. 10, the ATM_Out line represents the sum of the Xmit_Cell$_1$ and the Xmit_Cell$_2$ lines and is the output on line 8-OO from the variable rate generator of FIG. 8.

It will be apparent from Tables 2 and 3 and from FIG. 10 that the issue rate unit of FIG. 8 decreases the issue rate (for example, Xmit_Cell$_1$ rate) exponentially in response to a congestion signal. In Table 2, the PROCEDURE Rate Adjust at line 41 when embodied in circuitry is a means for decreasing the issue rate exponentially. Similarly, the Xmit Rate Recovery Routine at line 77 of Table 2 is a means for increasing the issue rate exponentially in response to the absence of a congestion signal. The rate of increasing the transmission rate, after it has been decreased in response to congestion, is less than the original rate used to decrease the transmission rate in response to congestion. Making the increasing and decreasing rates different tends to avoid oscillation in the transmission rate and improve the reactive control.

TABLE 1

Parameter Values For Automatic Rate Control Algorithm

Preset operation mode (for entire network)

Congestion_Indicator:
    0 - Return_Cell    /* Congestion indicated by a return cell */
    1 - Packet_Loss    /* Congestion indicated by packet loss */

Preset static control variable (for each virtual channel)

RC_Mode:
    000 - Recovery_Value = $2^0$ = 1
    001 - Recovery_Value = $2^1$ = 2
    010 - Recovery_Value = $2^2$ = 4
    011 - Recovery_Value = $2^3$ = 8
    100 - Recovery_Value = $2^4$ = 16
    101 - Disable_Recovery
    110 - Disable_RateControl
    111 - VirtualChannel_Shutdown State variables (for each virtual channel)

Cong_Level:
    000 - normal    /* Full Rate_Queue Xmit_Rate */
    001 - half    /* ½ Rate_Queue Xmit_Rate */
    010 - quarter    /* ¼ Rate_Queue Xmit_Rate */
    011 - eighth    /* ⅛ Rate_Queue Xmit_Rate */
    100 - sixteenth    /* 1/16 Rate_Queue Xmit_Rate */
    101 - zero    /* no cell transmission */
RC_Inhibit:
    0 - Inhibit_Inactive
    1 - Inhibit_Active
Recovery_Count:
    4-bit count Incoming congestion signals Cong_Signal:
    0 - No_Cell_Waiting    /* No return cell waiting */
    1 - Cell_Waiting    /* Return cell waiting for processing */
Cong_Signal_VCI:
    identifier    /* Virtual channel identifier of return cell, typically 10 to 16 bits */
Pkt_Loss_Signal:
    0 - No_Signal_Waiting    /* No Pkt_Loss_Signal waiting */
    1 - Signal_Waiting    /* Packet loss signal waiting for processing */
Pkt_Loss_VCI:
    identifier    /* Virtual channel identifier of waiting Pkt_Loss_Signal, 10 to 16 bits typical*/

Signals from timers (for each Rate_Queue)

Xmit_Time:

TABLE 1-continued

Parameter Values For Automatic Rate Control Algorithm

|   |   |   |
|---|---|---|
| | 1 - Active | /* Time to service this Rate_Queue */ |
| | 0 - Inactive | /* Not time to service this Rate_Queue */ |
| X_count: | | |
| | 4-bit count | /* Count from X-counter */ |

TABLE 2

Automatic Rate Control Algorithm
© Copyright Adapative Corporation 1991

```
/* Scheduler */
1    REPEAT
2        FOREACH Rate_Queue
3           IF (Xmit_Time [Rate_Queue] = Active)
4           THEN Service_Rate_Queue (Rate_Queue)
5           ENDIF;
6              Check_Cong_Signal;
7        ENDFOREACH;
8    ENDREPEAT;

/* Check for congestion signal waiting for processing */
11   PROCEDURE Check_Cong_Signal;
12        IF (Congestion_Indicator = Return_Cell)
13        THEN
14           IF (Cong_Signal = Cell_Waiting)
15           THEN Rate_Adjust (Cong_Signal_VCI);
16           ENDIF;
17        ELSE
18           IF (Pkt_Loss_Signal = Signal_Waiting)
19           THEN Rate_Adjust (Pkt_Loss_VCI);
20           ENDIF;
21        ENDIF;
22   ENDPROC;

/* Modify rate of identified virtual channel upon receiving congestion signal */
41   PROCEDURE Rate_Adjust (Virt_Chan);
42        READ for Virt_Chan (RC_Mode, RC_Inhibit, Recovery_Count, Cong_Level);
43        IF (RC_Mode != Disable_RateControl)
44        AND (RC_Inhibit != Inhibit_Active)
45        THEN
46           IF (Cong_Level != zero)
47           THEN increment Cong_Level;
48           ENDIF;
49              RC_Inhibit := Inhibit_Active;
50              Recovery_Count := 0;
51        ENDIF;
52        WRITE for Virt_Chan (RC_Inhibit, Recovery_Count, Cong_Level);
53   ENDPROC;

/* Service each virtual channel in rate queue */
61   PROCEDURE Service_Rate_Queue (Rate_Queue);
62        FOREACH Virt_Chan in Rate_Queue
63           READ for Virt_Chan (RC_Mode, RC_Inhibit, Recovery_Count, Cong_Level);

/* Xmit Cell Routine */

64           IF (RC_Mode != VC_Shutdown)
65           THEN
66              IF (Cong_Level = normal)
67              OR (Cong_Level = half      AND Xcount[Rate_Queue] = ???1)
68              OR (Cong_Level = quarter   AND Xcount[Rate_Queue] = ??11)
69              OR (Cong_Level = eighth    AND Xcount[Rate_Queue] = ?111)
70              OR (Cong_Level = sixteenth AND Xcount[Rate_Queue] = 1111)
71              OR (Cong_Level = zero      AND Xcount[Rate_Queue] = 1111)
72              THEN
73                 IF (Cong_Level != zero)
74                 THEN Xmit_Cell (Virt_Chan);                 /* Xmit next cell */
75                 ENDIF;
76                    RC_Inhibit := Inhibit_Inactive;

/* Xmit Rate Recovery Routine */
```

TABLE 2-continued

Automatic Rate Control Algorithm
© Copyright Adapative Corporation 1991

```
77                    ┌─ IF (RC_Mode != Disable_RateControl)
78                    │  AND (RC_Mode != Disable_Recovery)
79                    ├─ THEN
80                    │     ┌─ IF (Recovery_Count = Recovery_Value)
81                    │     ├─ THEN
82                    │     │    ┌─ IF (Cong_Level != normal)
83                    │     │    ├─ THEN decrement Cong_Level;
84                    │     │    └─ ENDIF;
85                    │     │       Recovery_Count := 0;
86                    │     ├─ ELSE
87                    │     │     Increment Recovery_Count;
88                    │     └─ ENDIF;
89                    └─ ENDIF;
90                       WRITE for Virt_Chan (RC_Inhibit, Recovery_Count, Cong_Level);
91               └─ ENDIF;
92            └─ ENDIF;
93                Check_Cong_Signal;
94         └─ ENDFOREACH;
95  └─ ENDPROC;
```

Table 3
Sequenced Execution For Rate_Queue$_1$ And Virt_Chan$_1$ $XR_10$

```
L1    REPEAT
L2    FOREACH Rate_Queue
L3    IF (Xmit_Time [Rate_Queue₁] = Active)
L4    THEN  Service_Rate_Queue (Rate_Queue₁)
L61   PROCEDURE Service_Rate_Queue (Rate_Queue₁);
L62   FOREACH Virt_Chan in Rate_Queue₁
L63   READ Virt_Chan₁ (RC_Mode = 000, RC_Inhibit = 0, Recovery_Count =0000,
      Cong_Level =000);
L64   RC_Mode != VC_Shutdown
L65   THEN
L66   Cong_Level = normal
L72   THEN
L73   Cong_Level != zero
L74   Xmit_Cell (Virt_Chan₁)
L75   END
L76   RC_Inhibit := Inhibit_Inactive
L77   RC_Mode != Disable_RateControl
L78   RC_Mode != Disable_Recovery
L79   THEN
L80   Recovery_Count(0000) != Recovery_Value(0001)
L86   ELSE
L87   Increment Recovery_Count := 0001
L88   END
L89   END
L90   WRITE for Virt_Chan₁ (RC_Inhibit = 0, Recovery_Count = 0001, Cong_Level
      = 000);
L91   END
L92   END
L93   Check_Cong_Signal
L94   END
L95   END
L5    END
L6    Check_Cong_Signal
L7    END
L8    END
```

$XR_10+$

```
L1    REPEAT
L2    FOREACH Rate_Queue
L3    IF (Xmit_Time [Rate_Queue₁] = Inactive)
L5    END
L6    Check_Cong_Signal
L7    END
L8    END
```

$XR_10++$

```
L1    REPEAT
L2    FOREACH Rate_Queue
L3    IF (Xmit_Time [Rate_Queue₁] = Inactive)
L5    END
L6    Check_Cong_Signal
L7    END
L8    END
```

.
.
.

Table 3
Sequenced Execution For Rate_Queue$_1$ And Virt_Chan$_1$

XR$_1$1
```
    L1    REPEAT
    L2    FOREACH Rate_Queue
    L3    IF (Xmit_Time [Rate_Queue₁] = Active)
    L4    THEN   Service_Rate_Queue (Rate_Queue₁)
    L61   PROCEDURE Service_Rate_Queue (Rate_Queue₁);
    L62   FOREACH Virt_Chan in Rate_Queue₁
    L63   READ Virt_Chan₁ (RC_Mode = 000, RC_Inhibit = 0, Recovery_Count =0001,
          Cong_Level =000);
    L64   RC_Mode != VC_Shutdown
    L65   THEN
    L66   Cong_Level = normal
    L72   THEN
    L73   Cong_Level != zero
    L74   Xmit_Cell (Virt_Chan₁)
    L75   END
    L76   RC_Inhibit := Inhibit_Inactive
    L77   RC_Mode != Disable_RateControl
    L78   RC_Mode != Disable_Recovery
    L79   THEN
    L80   Recovery_Count(0001) = Recovery_Value(0001)
    L81   THEN
    L82   Cong_Level = 000(normal)
    L84   END
    L85   Recovery_Count := 0000
    L88   END
    L89   END
    L90   WRITE for Virt_Chan₁ (RC_Inhibit = 0, Recovery_Count = 0000, Cong_Level
          = 000);
    L91   END
    L92   END
    L93   Check_Cong_Signal
    L94   END
    L95   END
    L5    END
    L6    Check_Cong_Signal
    L7    END
    L8    END
```

XR$_1$1+
```
    L1    REPEAT
    L2    FOREACH Rate_Queue
    L3    IF (Xmit_Time [Rate_Queue₁] = Inactive)
    L5    END
    L6    Check_Cong_Signal
    L7    END
    L8    END
```

Table 3
Sequenced Execution For Rate_Queue$_1$ And Virt_Chan$_1$

XR$_1$1++
.
.
.

XR$_1$2
    L1
    L2
    L3
    L4
    L62
    L63    READ Virt_Chan$_1$ (Recovery_Count =0000)
    L64
    L65
    L66
    L72
    L73
    L74    Xmit_Cell (Virt_Chan$_1$)
    L75
    L76
    L77
    L78
    L79
    L80    Recovery_Count(0000) != Recovery_Value(0001)
    L86    ELSE
    L87    Increment Recovery_Count := 0001
    L88
    L89
    L90    WRITE for Virt_Chan$_1$ (Recovery_Count = 0001);
    L91
    L92
    L93
    L94
    L95
    L5
    L6
    L7
    L8

XR$_1$2+
    L1    REPEAT
    L2    FOREACH Rate_Queue
    L3    IF (Xmit_Time [Rate_Queue$_1$] = Inactive)
    L5    END
    L6    Check_Cong_Signal
    L7    END
    L8    END

XR$_1$2++
.
.
.

Table 3
Sequenced Execution For Rate_Queue$_1$ And Virt_Chan$_1$

XR$_1$3

```
L1
L2
L3
L4
L6
L6
L63    READ Virt_Chan₁ (Recovery_Count =0001);
L64
L65
L66
L72
L73
L74    Xmit_Cell (Virt_Chan₁)
L75
L76
L77
L78
L79
L80
L81
L82
L84
L85    Recovery_Count := 0000
L88
L89
L90    WRITE for Virt_Chan₁ (Recovery_Count = 0000);
L91
L92
L93    Check_Cong_Signal
L94
L95
L5
L6     Check_Cong_Signal
L7
L8
```

XR$_1$3+

```
L1     REPEAT
L2     FOREACH Rate_Queue
L3     IF (Xmit_Time [Rate_Queue₁] = Inactive)
L5     END
L6     Check_Cong_Signal
L7     END
L8     END
```

Table 3
Sequenced Execution For Rate_Queue₁ And Virt_Chan₁

XR₁3++
```
     L1    REPEAT
     L2    FOREACH Rate_Queue
     L3    IF (Xmit_Time [Rate_Queue₁] = Inactive)
     L5    END
     L6    Check_Cong_Signal L11   PROCEDURE Check_Cong_Signal
     L12   Congestion_Indicator = Return_Cell
     L13   THEN
     L14   Cong_Signal = Cell_Waiting
     L15   THEN Rate_Adjust (Cong_Signal_VCI₁)

L41   PROCEDURE Rate_Adjust (Virt_Chan₁)
     L42   READ Virt_Chan₁ (RC_Mode = 000, RC_Inhibit = 0, Recovery_Count = 0000,
           Cong_Level =000);
     L43   RC_Mode != Disable_RateControl
     L44   RC_Inhibit != Inhibit_Active
     L45   THEN
     L46   Cong_Level != zero
     L47   THEN increment Cong_Level to 001 (half)
     L48   END
     L49   RC_Inhibit := 1-Inhibit_Active;
     L50   Recovery_Count := 0;
     L51   END
     L52   WRITE for Virt_Chan (RC_Inhibit = 1, Recovery_Count = 0000, Cong_Level =
           001);
     L53   ENDPROC

L16   END
     L21   ENDIF
     L22   ENDPROC

L7    END
     L8    ENDREPEAT
```

XR₁3+++
```
     L1    REPEAT
     L2    FOREACH Rate_Queue
     L3    IF (Xmit_Time [Rate_Queue₁] = Inactive)
     L5    END
     L6    Check_Cong_Signal
     L7    END
     L8    END
```

.
.
.

Table 3
Sequenced Execution For Rate_Queue₁ And Virt_Chan₁

XR₁4
```
    L1   REPEAT
    L2   FOREACH Rate_Queue
    L3   IF (Xmit_Time [Rate_Queue₁] = Active)
    L4   THEN Service_Rate_Queue (Rate_Queue₁)
    L61  PROCEDURE Service_Rate_Queue (Rate_Queue₁);
    L62  FOREACH Virt_Chan in Rate_Queue₁
    L63  READ Virt_Chan₁ (RC_Mode = 000, RC_Inhibit = 1, Recovery_Count =0000,
         Cong_Level =001);
    L64  RC_Mode != VC_Shutdown
    L65  THEN
    L66  IF
    L67  OR Cong_Level = half AND Xcount = 1110 (!= ???1)
    L91  END
    L92  END
    L93  Check_Cong_Signal
    L94  END
    L95  END
    L5   END
    L6   Check_Cong_Signal
    L7   END
    L8   END
```

XR₁4+
```
    L1   REPEAT
    L2   FOREACH Rate_Queue
    L3   IF (Xmit_Time [Rate_Queue₁] = Inactive)
    L5   END
    L6   Check_Cong_Signal
    L7   END
    L8   END
```

XR₁4++
```
    L1   REPEAT
    L2   FOREACH Rate_Queue
    L3   IF (Xmit_Time [Rate_Queue₁] = 0-Inactive)
    L5   END
    L6   Check_Cong_Signal
    L7   END
    L8   END
```

.
.
.

Table 3
Sequenced Execution For Rate_Queue₁ And Virt_Chan₁

$XR_1 5$

```
L1    REPEAT
L2    FOREACH Rate_Queue
L3    IF (Xmit_Time [Rate_Queue₁] = Active)
L4    THEN Service_Rate_Queue (Rate_Queue₁)
L61   PROCEDURE Service_Rate_Queue (Rate_Queue₁);
L62   FOREACH Virt_Chan in Rate_Queue₁
L63   READ Virt_Chan₁ (RC_Mode = 000, RC_Inhibit = 1, Recovery_Count =0000,
      Cong_Level =001);
L64   RC_Mode != VC_Shutdown
L65   THEN
L66   IF
L67   OR Cong_Level = 001-half AND Xcount = 1111 (=???1)
L72   THEN
L73   Cong_Level != zero
L74   Xmit_Cell (Virt_Chan₁)
L75   END
L76   RC_Inhibit := 0-Inhibit_Inactive
L77   RC_Mode != Disable_RateControl
L78   RC_Mode != Disable_Recovery
L79   THEN
L80   Recovery_Count(0000 != Recovery_Value(0001)
L86   ELSE
L87   Increment Recovery_Count := 0001
L88   END
L89   END
L90   WRITE for Virt_Chan₁ (RC_Inhibit = 0, Recovery_Count = 0001, Cong_Level
      = 001);
L91   END
L92   END
L93   Check_Cong_Signal
L94   END
L95   END
L5    END
L6    Check_Cong_Signal
L7    END
L8    END
```

$XR_1 5+$

```
L1    REPEAT
L2    FOREACH Rate_Queue
L3    IF (Xmit_Time [Rate_Queue₁] = Inactive)
L5    END
L6    Check_Cong_Signal
L7    END
L8    END
```

Table 3
Sequenced Execution For Rate_Queue$_1$ And Virt_Chan$_1$

XR$_1$5++
```
L1      REPEAT
L2      FOREACH Rate_Queue
L3      IF (Xmit_Time [Rate_Queue₁] = Inactive)
L5      END
L6      Check_Cong_Signal L11     PROCEDURE Check_Cong_Signal
L12     Congestion_Indicator = Return_Cell
L13     THEN
L14     Cong_Signal = Cell_Waiting
L15     THEN Rate_Adjust (Cong_Signal_VCI₁)

L41     PROCEDURE Rate_Adjust (Virt_Chan₁)
L42     READ Virt_Chan₁ (RC_Mode = 000, RC_Inhibit = 0, Recovery_Count = 0000,
        Cong_Level =001);
L43     RC_Mode != Disable_RateControl
L44     RC_Inhibit != Inhibit_Active
L45     THEN
L46     Cong_Level != zero
L47     THEN increment Cong_Level to 010 (quarter)
L48     END
L49     RC_Inhibit := 1-Inhibit_Active;
L50     Recovery_Count := 0000;
L51     END
L52     WRITE for Virt_Chan (RC_Inhibit = 1, Recovery_Count = 0000, Cong_Level =
        010);
L53     ENDPROC

L16     END
L21     ENDIF
L22     ENDPROC

L7      END
L8      ENDREPEAT
```

XR$_1$5+++
```
L1      REPEAT
L2      FOREACH Rate_Queue
L3      IF (Xmit_Time [Rate_Queue₁] = Inactive)
L5      END
L6      Check_Cong_Signal
L7      END
L8      END
```

.
.
.

Table 3
Sequenced Execution For Rate_Queue$_1$ And Virt_Chan$_1$

XR$_1$6

```
L1    REPEAT
L2    FOREACH Rate_Queue
L3    IF (Xmit_Time [Rate_Queue₁] = Active)
L4    THEN Service_Rate_Queue (Rate_Queue₁)
L61   PROCEDURE Service_Rate_Queue (Rate_Queue₁);
L62   FOREACH Virt_Chan in Rate_Queue₁
L63   READ Virt_Chan₁ (RC_Mode = 000, RC_Inhibit = 1, Recovery_Count =0000,
      Cong_Level =010);
L64   RC_Mode != VC_Shutdown
L65   THEN
L66   IF
L68   OR Cong_Level = 010-quarter AND Xcount = 0000(!= ??11)
L91   END
L92   END
L93   Check_Cong_Signal
L94   END
L95   END
L5    END
L6    Check_Cong_Signal
L7    END
L8    END
```

XR$_1$6+

```
L1    REPEAT
L2    FOREACH Rate_Queue
L3    IF (Xmit_Time [Rate_Queue₁] = Inactive)
L5    END
L6    Check_Cong_Signal
L7    END
L8    END
```

XR$_1$6++

```
L1    REPEAT
L2    FOREACH Rate_Queue
L3    IF (Xmit_Time [Rate_Queue₁] = Inactive)
L5    END
L6    Check_Cong_Signal
L7    END
L8    END
```

.
.
.

XR$_1$7

.
.

L68   OR Cong_Level = 010-quarter AND Xcount = 0001(!= ??11)

.
.

XR$_1$8

.
.

L68   OR Cong_Level = 010-quarter AND Xcount = 0010(!= ??11)

.
.

Table 3
Sequenced Execution For Rate_Queue$_1$ And Virt_Chan$_1$

XR$_1$9

| | | |
|---|---|---|
| | L1 | REPEAT |
| | L2 | FOREACH Rate_Queue |
| | L3 | IF (Xmit_Time [Rate_Queue$_1$] = Active) |
| | L4 | THEN Service_Rate_Queue (Rate_Queue$_1$) |
| | L61 | PROCEDURE Service_Rate_Queue (Rate_Queue$_1$); |
| | L62 | FOREACH Virt_Chan in Rate_Queue$_1$ |
| | L63 | READ Virt_Chan$_1$ (RC_Mode = 000, RC_Inhibit = 1, Recovery_Count =0000, Cong_Level =010); |
| | L64 | RC_Mode != VC_Shutdown |
| | L65 | THEN |
| | L66 | IF |
| | L67 | OR Cong_Level = 010-quarter AND Xcount = 0011 (=??11) |
| | L72 | THEN |
| | L73 | Cong_Level != zero |
| | L74 | Xmit_Cell (Virt_Chan$_1$) |
| | L75 | END |
| | L76 | RC_Inhibit := 0-Inhibit_Inactive |
| | L77 | RC_Mode != Disable_RateControl |
| | L78 | RC_Mode != Disable_Recovery |
| | L79 | THEN |
| | L80 | Recovery_Count(0000 != Recovery_Value(0001) |
| | L86 | ELSE |
| | L87 | Increment Recovery_Count := 0001 |
| | L88 | END |
| | L89 | END |
| | L90 | WRITE for Virt_Chan$_1$ (RC_Inhibit = 0, Recovery_Count = 0001, Cong_Level = 010); |
| | L91 | END |
| | L92 | END |
| | L93 | Check_Cong_Signal |
| | L94 | END |
| | L95 | END |
| | L5 | END |
| | L6 | Check_Cong_Signal |
| | L7 | END |
| | L8 | END |

XR$_1$9+

| | | |
|---|---|---|
| | L1 | REPEAT |
| | L2 | FOREACH Rate_Queue |
| | L3 | IF (Xmit_Time [Rate_Queue$_1$] = Inactive) |
| | L5 | END |
| | L6 | Check_Cong_Signal |
| | L7 | END |
| | L8 | END |

Table 3
Sequenced Execution For Rate_Queue$_1$ And Virt_Chan$_1$ $XR_19$++
```
      L1    REPEAT
      L2    FOREACH Rate_Queue
      L3    IF (Xmit_Time [Rate_Queue₁] = Inactive)
      L5    END
      L6    Check_Cong_Signal L11   PROCEDURE Check_Cong_Signal
      L12   Congestion_Indicator = Return_Cell
      L13   THEN
      L14   Cong_Signal = Cell_Waiting
      L15   THEN Rate_Adjust (Cong_Signal_VCI₁)

L41   PROCEDURE Rate_Adjust (Virt_Chan₁)
      L42   READ Virt_Chan₁ (RC_Mode = 000, RC_Inhibit = 0, Recovery_Count = 0000,
            Cong_Level =010);
      L43   RC_Mode != Disable_RateControl
      L44   RC_Inhibit != Inhibit_Active
      L45   THEN
      L46   Cong_Level != zero
      L47   THEN increment Cong_Level to 011 (eighth)
      L48   END
      L49   RC_Inhibit := 1-Inhibit_Active
      L50   Recovery_Count := 0000
      L51   END
      L52   WRITE Virt_Chan₁ (RC_Inhibit = 1, Recovery_Count = 0000, Cong_Level =
            011);
      L53   ENDPROC

L16   END
      L21   ENDIF
      L22   ENDPROC

L7    END
      L8    ENDREPEAT
```

$XR_19$+++
```
      L1    REPEAT
      L2    FOREACH Rate_Queue
      L3    IF (Xmit_Time [Rate_Queue₁] = Inactive)
      L5    END
      L6    Check_Cong_Signal
      L7    END
      L8    END
```
.
.
.

$XR_110$
.
.
```
      L69   OR Cong_Level = 011-eighth AND Xcount = 0100 (!= ?111)
```
.
.

Table 3
Sequenced Execution For Rate_Queue$_1$ And Virt_Chan$_1$

XR$_1$11

L69    OR Cong_Level = 011-eighth AND Xcount = 0101 (!= ?111)

XR$_1$12

L69    OR Cong_Level = 011-eighth AND Xcount = 0110 (!= ?111)

XR$_1$13

L69    OR Cong_Level = 011-eighth AND Xcount = 0111 (= ?111)
  L74    Xmit_Cell (Virt_Chan$_1$)
  L87    Increment Recovery_Count := 0001

XR$_1$14

L69    OR Cong_Level = 011-eighth AND Xcount = 1000 (= ?111)

XR$_1$15

L69    OR Cong_Level = 011-eighth AND Xcount = 1001 (= ?111)

XR$_1$16
XR$_1$17
XR$_1$18
XR$_1$19
XR$_1$20

L69    OR Cong_Level = 011-eighth AND Xcount = 1110 (= ?111)

Table 3
Sequenced Execution For Rate_Queue$_1$ And Virt_Chan$_1$

XR$_1$21

.
     .

L69    OR Cong_Level = 011-eighth AND Xcount = 1111 (= ?111)

L74    Xmit_Cell (Virt_Chan$_1$)

.

L80    Recovery_Count(0001 = Recovery_Value(0001)
     L81    THEN
     L82    Cong_Level = 011 (!= normal)
     L83    THEN decrement Cong_Level := 010-quarter
     L84    END
     L85    Recovery_Count := 0000
     L88    END
     L89    END
     L90    WRITE for Virt_Chan$_1$ (RC_Inhibit = 0, Recovery_Count = 0000, Cong_Level = 010;
     L91    END
     L92    END
     L93    Check_Cong_Signal
     L94    END
     L95    END
     L5     END
     L6     Check_Cong_Signal
     L7     END
     L8     END

XR$_1$22

.
     .

L68    OR Cong_Level = 010-quarter AND Xcount = 0000 (!= ??11)

.
     .

XR$_1$25

.
     .

L68    OR Cong_Level = 010-quarter AND Xcount = 0011 (= ??11)

L74    Xmit_Cell (Virt_Chan$_1$)

L87    Increment Recovery_Count := 0001

.

XR$_1$26
XR$_1$27
XR$_1$28

Table 3
Sequenced Execution For Rate_Queue$_1$ And Virt_Chan$_1$

XR$_1$29

```
         .
         .
         .
L68    OR Cong_Level = 010-quarter AND Xcount = 0111 (= ?111)

L74    Xmit_Cell (Virt_Chan₁)
         .
         .
L80    Recovery_Count(0001 = Recovery_Value(0001)
L81    THEN
L82    Cong_Level = 010 (!= normal)
L83    THEN decrement Cong_Level := 001-half
L84    END
L85    Recovery_Count := 0000
L88    END
L89    END
L90    WRITE for Virt_Chan₁ (RC_Inhibit = 0, Recovery_Count = 0000, Cong_Level
       = 001)
L91    END
L92    END
L93    Check_Cong_Signal
L94    END
L95    END
L5     END
L6     Check_Cong_Signal
L7     END
L8     END
```

The overall network operation, using variable rate sources of the type described, is characterized using the following terms.

"Bit" is a binary unit of information.

"Byte" is a fixed number of bits, typically 8 bits.

"Packet" is a communication message formed of bytes, typically of variable length from 40 to 10,000 bytes.

"Cell" is a fixed length communication message formed of bytes, typically 53 bytes (5 byte header/48 byte data).

"Bit Rate" (BiR) is rate at which a communication system transmits bits.

"Byte Rate" (ByR) is rate at which a communication system transmits bytes.

"Cell rate" (CR) is rate at which a communication system transmits cells.

"Cell Interval" (CI) is period from one cell to the next cell.

"Channel Cell Interval" (CCI) is the cell interval for a virtual channel transmitting at the Channel Peak Cell Rate.

"Maximum Channel Peak Cell Rate" (MCPCR) is the cell rate assigned to a particular channel in the absence of congestion.

"Current Channel Peak Cell Rate" (CCPCR) is the current cell rate at a particular time for a virtual channel and may equal the Maximum Channel Peak Cell Rate in the absence of congestion and may be less than the Maximum Channel Peak Cell Rate when congestion is present.

"Communication Interval" (CI) is a time period in a network, typically measured as a number of cell intervals.

"Average Cell Rate" (ACR) is the average number of cells transmitted over a communication interval in a virtual channel.

"Cell Transmission Interval" (CTI) is the average period of time for a cell to travel from one location in a network to another location in the network.

"Modification Interval" (MI) is the period of time required to modify a communication parameter.

Wide-Area Network Formed By Plural Local Networks

Figure 9:
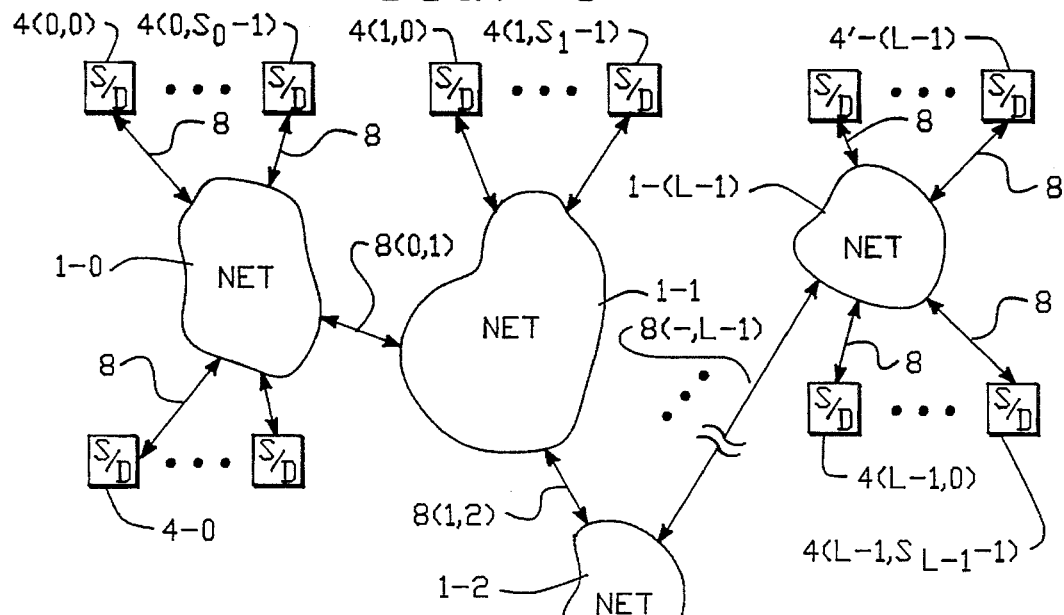
FIG. 9 depicts a schematic block diagram of a plurality of source/destination (S/D) users connected through a wide-area multinode network formed of a plurality of local networks.

In FIG. 9, a wide-area communication system employing networks of the FIG. 1 type is shown. The FIG. 9 system is comprised of a group of generally local communication systems including the networks 1-0, 1-1, . . . , 1-(L-1). Each of the local networks of FIG. 9 includes source and destination units of the type previously described in connection with the FIG. 1 network. Specifically, local communication systems are formed by the local network 1-0 together with the local source/destination (S/D) units 4(0,0), . . . , 4(0,$S_0$-1), the local network 1-1 together with the local the S/D units 4(1,0), . . . , 4(1,$S_1$-1), and the local network 1-2 together with the local S/D units 4(2,0), . . . , 4(2,$S_2$-1) and the local network 1-(L-1) together with the local the S/D units 4(L-1, $S_{L-1}$-1).

In FIG. 9, the wide-area system includes a wide-area source 4-0 connected to local network 1-0 and a wide-area destination 4'-(L-1) connected to local network 1-(L-1).

In FIG. 9, the local networks 1 are connected together by links 8 and specifically link 8(0,1) connects local networks 1-0 and 1-1, link 8(1,2) connects local networks 1-1 and 1-2 and so on such that local network 1-(L-1) is connected through links 8 and local networks to local network 1-0. In this manner, wide-area source 4-0 is connected to wide-area destination 4'-(L-1). The wide-area S/D units 4-0 and 4'-(L-1) are typical of many such units which, for clarity, are not shown in FIG. 9. In FIG. 9, the links 8(0,1), 8(1,2), 8(2,__), . . . , 8(__,L-1) between local networks are the same as the links 8 between local S/D units except that they are typically longer in length.

In FIG. 9, a plurality of virtual channels are established between wide-area S/D units and local S/D units. Accordingly, a virtual channel is established, for example, between S/D unit 4-0 and S/D unit 4'-(L-1).

In the operation of the FIG. 1 network as previously described in connection with FIG. 10 and TABLES 1 through 3, it was assumed that the cell transmission interval (CTI) was short. This short cell transition interval was evident since the transmitted cell at $XR_13$ resulted in a congestion signal, Cong_Signal$_1$ at a time $XR_13+$, only a short time after the cell was transmitted. Accordingly, the forward transmission of the cell at $XR_13$ originated with reference to FIG. 3 at the source 4-(S) and was transmitted into the network along the virtual channel of FIG. 3 possibly as far as the node 5-(C-1) or the destination 4(D). When the congestion was encountered, a return cell was transmitted along the return path 8-R so as to arrive back at the source 4-(S) in a fraction of a Channel Cell Interval (CCI). In FIG. 10, for virtual channel 1, the CCI interval is the interval between each Xmit_Rate$_1$ time, for example, between $XR_10$ and $XR_11$. Accordingly, the reactive control operation in reducing the transmission rate in the FIG. 10 example was very fast.

In FIG. 10, the return transmission interval for a congestion signal returning from a congested node to the source is short and in particular is less than a single CCI as measured from the time that the original cell was transmitted from the source in the forward direction. The return transmission interval, therefore, includes both the forward path delay (from the source to the node having congestion) and the return path delay (from the node having congestion back to the source). Also included within the return transmission interval is the delay resulting from the return cell processing time required for converting forward cells to return cells and processing the return cells.

While the FIG. 10 example had a return transmission interval of less than one CCI, return transmission intervals of less than approximately 10 CCI are still considered short so that the issue rate unit can reactively modify the transmission rate and thereby reduce congestion.

In order to keep the return transmission interval short, the return cell processing time must also be kept short and is desirable much less than the return transmission interval.

In the FIG. 9 system, it is contemplated that the distance between the local network 1-0, for example, and the local network 1-(L-1) may be very far so that the delay time that may be encountered by a source 4-0 associated with network 1-0 in cell transmissions to a destination, for example, 4'-(L-1) associated with a network 1-(L-1) may be much longer than a Channel Cell Interval. The longer the transmission time from a source to a destination and the return time from the destination back to the source, the less effective becomes the reactive control mechanism of the present invention. If all communications in a very long network were only from the source at one end of the network to a destination at the far end of the network, then the effectiveness of the present invention for very long distance networks is reduced. However, experience indicates that a large percentage (for example, 80%) of data traffic in a large network tends to be local and not the full long distance of the network. For example, if the traffic for the network 1-0 between the S/D units 4(0,0), ..., 4(0,S$_0$-1) is principally local, then the reactive control mechanism of the present invention is effective for controlling the congestion by controlling the transmission issue rate of the local sources for the network 1-0. Similarly, for each of the other local networks such as networks 1-1 and 1-2 of FIG. 9, the local traffic in each of those networks is controlled by controlling the issue rate and the sources for local traffic in those networks. Since the entire network of FIG. 9 is composed by groups of local networks and each local network is effective to control congestion by controlling the local traffic issue rates, congestion is effectively controlled for the entire network of FIG. 9.

As discussed in connection with FIG. 7, different priorities can be given to traffic. For example, long distance traffic can be allocated to the queue 73 so that it has higher priority than local traffic allocated to the queue 69. By selecting a balance between local traffic which can effectively be controlled by the congestion control mechanism of the present invention and longer distance traffic, congestion is effectively controlled for the entire network.

Further and Other Embodiments

In FIGS. 5 through 7, a number of different queues (such as queues 52, 54, 55, 57, 61, 62, 69, 70, 73 or others) are used for queuing cells. These queues perform a number of functions and are, among other things, congestion signal generating means for generating congestion signals in response to congestion in the nodes. The signals Q1 (queue level) and N-EMT (not empty) are examples disclosed. The Q1 signal may include multiple signals such as 9/10-full, 3/4-full and 1/2-full. In such a case, the selectors (for example, 50 and 53 in FIG. 5) include the Q1 value to marker 49 with the return cell. Marker 49 includes the Q1 value in a field in the return cell to mark the return cell as a return cell and also to designate the level of congestion being experienced by the node. The more full the queue, the more congested the node. If any particular queue is less full than some value (for example, 1/2-full), such condition is defined to be an absence of congestion. In such case, no cell is returned and, therefore, there is an absence of congestion signals.

When multi-level congestion signals are returned in return cells, the algorithm of Table 2 is modified to respond to those levels. For example, the rate of increasing or decreasing the transmission rate is varied as a function of the congestion signal level returned.

In the embodiments of FIGS. 5 through 7, the various different queues are shown as distributed queues at different locations in the circuitry. However, such queues are preferable implemented together in a common random access memory (RAM). In RAM memory, the different queues are allocated different addresses and function in the same manner as the distributed queues described.

In the embodiment of FIG. 7, four queues (queues 57, 69, 70, 73) of different types are connected in parallel to feed the output link 18-OO through selector 71. The link 18-OO services the forward paths for some virtual channels and the return paths for some other virtual channels.

While FIG. 7 depicts four queues in parallel, any number of queues can be connected in parallel and such connection is readily implemented with queues in a common RAM memory. With parallel queues, the selectors (like selectors 67 and 71 in FIG. 7) select cells from the queues based upon some determined priority.

Each selector determines priority among queues. For example, for a four-way selector (like selector 71 in FIG. 7) priority is granted in some predefined order such as queue 57, queue 70, queue 73 and queue 69 because selector 71 grants priority in that order to the N-EMT signals (queue level) signals. When a larger number of queues is made available, for example, using common RAM memory, priority is indicated among queues using well-known means.

Filter For Backward Explicit Congestion Notification

The system of FIG. 1 employs backward explicit congestion notification (BECN). When a queue in any ATM switch node exceeds a threshold a request is made to send congestion signals, in the form of (BECN) cells, back to the sources S of the virtual channels currently submitting traffic to it. On receipt of a BECN cell on a particular virtual channel, a source must reduce its transmission rate for the indicated virtual channel. If no BECN cells are received on a particular virtual channel for a certain period of time, a source may gradually restore its transmission rate.

Figure 11:
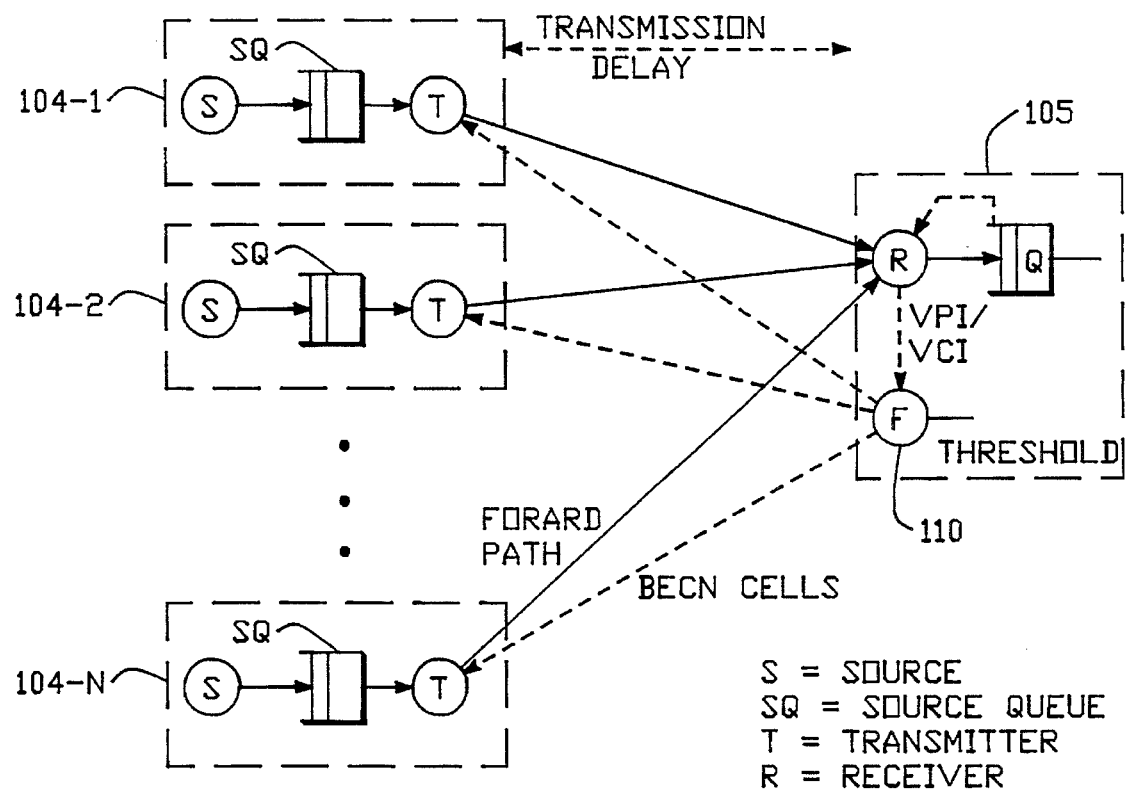
FIG. 11 depicts a schematic block diagram of a plurality of sources connected through a network with filtering of the requests for congestion signals.

The system of the type herebefore described is schematically represented in FIG. 11 where transmission is from a plurality of sources 4. Each source 104 includes a source S of cells transmitting through a plurality of source queues (SQ) and a transmitter (T) in one node to a receiver R to a common node 105. The sources 104 in FIG. 11 can represent the sources 4 of FIG. 1, for example, or can represent the virtual channels on a link 8 in FIG. 1. The node 105 of FIG. 11 represents, for example, the node 5T of FIG. 1. The node 105 includes a receiver (R), a filter (F), and a queue (Q). When the queue Q becomes too full, a request is made to the receiver R to send a congestion signal to the filter F. The filter F filters the requests for congestion signals and only returns a limited number of congestion signals.

In operation of the FIG. 11 system, each of a number of the sources S may generate traffic at saturation so that the queue Q feeding its transmitter T is never empty. Each of the transmitters (T) independently removes cells from its queue (Q) and transmits them to the receiver (R) at the peak cell rate. Them is a transmission delay (TD) between each transmitter (T) transmitting a cell and the cell being received by the destination receiver (R). The transmission delay represents the combination of the propagation delay and the switching delay from the source (S) to the point of congestion. For clarity in the explanation all sources (S) are assumed to experience the same transmission delay.

If the number of cells stored in the destination queue (Q) exceeds a threshold, the filter (F) will generate BECN cells. With no filtering in the manner previously described, for each incoming cell, one BECN cell will be generated and returned to the source transmitter (T) of the incoming cell.

In the system previously described, the operation when congestion existed was to latch the VPI/VCI of the incoming cell; copy it into the header of the fixed BECN cell; and insert the resulting BECN cell into the cell stream in the reverse direction. The BECN cell returned the VPI/VCI to the source for every cell because VPI/VCI values are identical in both directions on a virtual connection.

In an improved design, a filter (F) 110 is provided to filter some of the requests for congestion signals that would otherwise have been returned in the previous example. Accordingly, not every request results in a congestion signal being returned. In FIGS. 5, 6, and 7, the filter 110 is inserted between reverse marker (RM) 49 and queue 52. Only some congestion signals are supplied to queue 52 as a result of the congestion signal requests from reverse markers 49.

Figure 12:
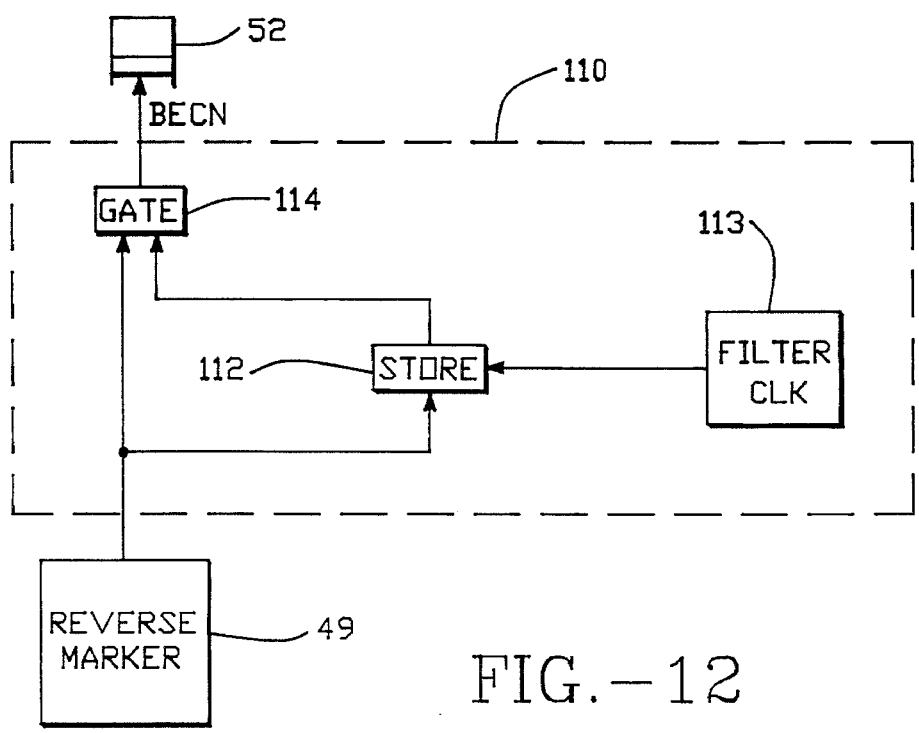
FIG. 12 depicts a schematic block diagram of a filter.

Filter - FIG. 12

In FIG. 12, further details of the filter design are shown. A store 112 includes a location for each of the virtual channels that may be communicating. A gate 114 is provided for gating some of the request signals from reverse marker 49 to the queue 52. A filter clock 113 is provided for establishing a filter period. The store 112 is cleared once per filter period. The store 112 can be implemented in several different embodiments. In a simple embodiment, store 112 is a single flip-flop common to all virtual channels. In another embodiment, the store 112 is a content addressable memory (CAM) which stores the virtual path and channel identifier. In another embodiment, store 112 has address locations, one for each virtual channel, for storing congestion indicators. In operation, the store 112 is read each time a request for a congestion signal is made as a result of congestion and thereafter is written in response to each request. Additionally, the store 112 is cleared at the beginning of each filter period.

The operation for the embodiment of store 112 that stores congestion indicators is more specifically as follows. Each request from the reverse marker (49 in FIGS. 4, 5, and 6) functions to address a location in store 112. Therefore, a VCI from the reverse marker 49 functions as a request for a congestion signal. Each location in store 112 can be set (binary 1 for example) with a congestion indicator. The setting of the congestion indicator occurs each time a request signal is received from the RM 49. The request signal causes the VCI for the requesting channel to address the corresponding location in the store 112. If when addressed, that location stores a congestion indicator (in the example, a binary 1) that congestion indicator provides a gate inhibiting signal to the gate 114 that prevents a congestion signal from being gated to queue 52. If when addressed, that location does not store a congestion indicator (for example, is a binary 0) that lack of a congestion indicator provides a gating signal to the gate 114 so that the request causes a congestion signal to be gated to queue 52. After being addressed for a read, a congestion indicator is automatically written into the location.

The filter clock 113 provides a clock signal, having a period that defines the filter period, for resetting the store 112. Once each filter period by operation of the clock signal, all the congestion indicators in the store 112 are reset (for example reset to binary 0). Typically, the filter period is set equal to approximately twice the transmission delay.

In order to describe the effect of the filter 110 on the system, two different filter designs are described for a reducing the amount of BECN traffic while maintaining acceptable performance. Under stable conditions, the BECN mechanism limits the maximum length of the queue so cells are never dropped at the destination queue.

When a transmitter (T) receives a BECN cell, the transmitter will reduce its cell transmission rate to one half of the current rate. If further BECN cells are received it will ignore them until it has transmitted at least one cell in the forward direction. Successive BECN cells will cause a transmitter to reduce its cell transmission rate to: 50%, 25%, 12%, 6%, after which a further BECN cell will cause it to stop transmitting. A transmission rate recovery mechanism is built into each transmitter. If no BECN cells are received within the source recovery time period, the current transmission rate for that transmitter will be restored to the previous level, once each recovery time period, until the transmission rate is restored to its original peak value. This algorithm is integrated into the AAL segmentation and reassembly processor.

For the example being described, the arriving traffic load exceeds the rate at which traffic is removed from the queue so that the system is in saturation. When the system is in saturation, the length of the queue grows until it passes the threshold. BECN cells are then generated that reduce the amount of arriving traffic. The queue length then declines until the sources recover, increase the incident traffic, and the queue length once more increases. Thus at saturation, the length of the queue oscillates.

For the example being described, the congestion control algorithm prevents any loss of traffic from the destination queue. For convenience, delays are expressed in cell times normalized to the output rate of the destination queue server (at 155 Mb/s one cell time is about 2.7 microsec).

No Filter Operation. In the absence of a BECN cell filter, the system may transmit more BECN traffic than is necessary. If the peak transmission rate of all sources is limited to a maximum of 25%, acceptable performance may be attained for limited transmission delays. (Less than 20% BECN cells and a maximum queue length of 500 cells for transmission delays of up to 30 cell times). This is acceptable for a single switch LAN but the addition of a BECN cell filter offers greatly improved performance.

Simple Filter. In the simple filter design, the store 112 of FIG. 12 is a single flip-flop for all channels. With this design, the performance is as follows. When the destination queue is past threshold, the filter permits one BECN cell to be generated every filter period. If the filter permits, the next incoming cell from RM149 will generate a BECN cell, after which no further BECN cells will be generated until the next filter period.

The BECN traffic and maximum queue length against transmission delay modelled was for 20 sources at a peak transmission rate of 25% with different filter periods. The recovery time constant of each source was 128 cell times and the queue threshold was 250 cells. With no filter (a filter period of zero), the throughput was about 70%. As the filter period was increased, the throughput increased, due to an increase in the mean queue length, and the BECN cell traffic was reduced. The rate of increase of the queue length with transmission delay increased as the filter period was increased. Depending upon the acceptable maximum queue length and the transmission delay, a filter period of up to 8 gave improved performance, compared to the performance with no filter, at a peak transmission rate of 25%. At a peak rate of 100%, however, with 20 sources at saturation, a BECN cell filter caused the maximum queue length to grow too rapidly to be useful even for filter periods as small as 1.

In the simple filter design, the amount of feedback information getting back to the sources is reduced thus increasing the time taken for the sources to respond to an overload event. The time spent in overload is increased, thus the mean and maximum queue lengths are increased, and the period of oscillation at saturation is also increased. The increased mean queue length and the increased period of oscillation imply that the queue empties less frequently which explains the improved throughput with increased filter period.

The simple BECN cell filter design with divide-by-two rate throttling does not reduce the incoming traffic quickly enough if sources are transmitting at a peak rate of 100%. Divide-by-two rate throttling is the operation whereby, for each returned congestion signal received at the source, the issue rate of transmitted cells is reduced by one-half. One way to deal with this problem is to increase the effect of each BECN cell. This increase is achieved, for example, by causing each BECN cell to throttle the source all the way down to zero and letting the source recover in the manner previously described. The BECN traffic and maximum queue length for this manner of operation were investigated for 5 sources transmitting at a peak rate of 100% with different filter periods. The recovery time constant of each source was 256 cell times and the queue threshold was 250 cells. Filter periods between 2 and 8 achieved a similar throughput (in excess of 80%) and maximum queue length. Filter periods of 4 and 8 limit the BECN traffic to below 10% for a transmission delay of up to 100 cell times. This configuration works well if sources transmit at a peak rate of 100%. It generates less BECN traffic and is capable of operation at higher transmission delays than the divide-by-two throttling scheme with the simple BECN filter. However, this configuration can only cope with a limited number of sources simultaneously bursting at a peak rate of 100% before the maximum queue length increases to an unacceptable value even at reasonable transmission delays. A major problem with the simple filter is that many of the BECN cells generated are redundant and are discarded by the source because the source has very recently been informed of the congestion by a previous BECN cell. For this reason, other improved filters are often desirable.

A Per Virtual Channel Filter. The filter 110 of FIG. 12 is improved when store 112 is a per virtual channel store. The optimum design of a filter is one that transmits only a single BECN cell to each active source during each filter period if the queue is congested. The optimum filter period is of the same order of magnitude as the maximum propagation delay for which the system is designed because there is little point in sending additional control feedback signals to the sources until previous feedback signals have had time to take effect. If the source recovery time constant is made slightly longer than the filter period, during overload, each source will reduce its transmission rate by half (using divide-by-two rate throttling) every filter period until the total incident traffic is reduced below the available bandwidth. To ensure fairness between all sources, the source recovery period should vary with the transmission rate (throttling level) so that the lower the transmission rate the shorter the source recovery period. A factor of four difference between the highest transmission rate and the lowest was found to be effective, with the shortest source recovery period being approximately equal to the filter period. In the steady-state this distribution causes each source to have an average transmission rate that approximately gives the source its fair share of the available bandwidth. The transmission rate toggles between the rate above the average rate and the rate below the average rate during successive filter time periods as the queue length oscillates about the congestion threshold.

The means for increasing the transmission rate in response to the absence of a congestion signal is embedded in the control of the variable rate issue unit and specifically the Xmit Rate Recovery Routine. That routine has the recovery count doubled at each successive higher rate or otherwise modified such that the increases vary with the transmission rate whereby for rate recovery, lower transmission rates increase faster than higher transmission rates. With this implementation, fairness is achieved among the different virtual channels.

Also, fairness can be improved if the the decreases in issue rate are greater than the divide-by-two decrease rate. For example, after receipt of a congestion signal, the rate may drop initially to a middle rate or to 0 and then recover from such a lower rate. Also, feedback information can be used to predict the appropriate rate based on the rates of other virtual channels that are active.

The FIG. 12 filter 110 with a per virtual channel store 112 is a per virtual channel filter since it keeps a record of the sources (virtual channels) to which BECN cells have been transmitted during each filter period.

The BECN traffic and mean and maximum queue length against transmission delay were modelled for the per virtual channel filter with up to 100 sources each attempting to transmit at a peak rate of 100%. The filter period was 768 cell times (about 2 ms at 155 Mb/s), the recovery time constant of each source at the lowest transmission rate was also 768 cell times and the queue threshold was 250 cells. In this operation, the number of transmission rates (throttling levels) of each source was increased by three more levels (to a total of nine levels including the 100% and zero levels namely, 100%, 50%, 25%, 12.5%, 6%, 3%, 1.5%, 0.78% and 0%) such that the minimum non-zero transmission rate was 0.78%. This distribution gives better results for large numbers of sources attempting to transmit at 100% of peak rate. The throughput remained mostly in excess of 80% for transmission delays up to 100 cell times and any number of sources. The amount of BECN traffic was about 0.08% per active source. The BECN traffic remained approximately constant with respect to transmission delay and was approximately proportional to the number of sources. Even for 100 sources transmitting at 100% of peak rate, the amount of BECN traffic was less than 9% and for 20 sources it was just over 1%. For any number of sources, and transmission delays of up to 100 cell times, the mean queue length was below 200 cells. Also, for up to about 20 sources the maximum queue length remained below 400 cells growing slowly with transmission delay. This operation of a per virtual channel filter is a vast improvement upon the simple filter.

In summary, the present invention employs backward explicit congestion notification, to support the dynamic sharing of ATM switch port capacity between high-speed bursty sources in the local area. If BECN cells are transported at a higher delay priority than data traffic, the maximum delay through an ATM switch is likely to be no more than a few cell times. At 155 Mb/s, a propagation delay of one cell time is equivalent to about 0.6 km of fiber. Therefore, a single switch ATM LAN is likely to have a transmission delay of around 5 cell times. In this case, the simple filter will offer adequate performance. Since sources in the local area prefer to transmit at 100% of peak rate (that is, at the full line rate) the throttle back to zero algorithm is most effective. For a limited number of simultaneously active sources, a throughput in excess of 85% with a maximum queue length of less than 500 cells may be attained for transmission delays of up to approximately 30 cell times with less than 5% BECN traffic.

For ATM LANs consisting of more than a single switch, distributed across a larger area of up to approximately 50 kin, or for networks in which a large number of sources are likely to attempt to transmit simultaneously at the full link rate, the per virtual channel filter offers excellent performance. A throughput mostly in excess of 80% may be maintained with only 0.08% of BECN traffic per source, independent of transmission delay, up to about 50 km. For a moderate number of sources (up to about 20) simultaneously attempting to transmit at the full link rate the maximum queue length remains below 400 cells. For any number of sources the mean queue length is less than 200 cells. This performance may be extended to a transmission delay of several hundred kilometers with some slight loss of throughput and increase in the mean and maximum queue lengths. Adjusting the queue threshold (250 cells in the above example) allows throughput to be traded for delay by adjusting the mean queue length and the proportion of time the queue remains empty. The implementation complexity of the BECN method with the per VC filter is much less than any of the hop-by-hop per VC credit or feedback schemes. The BECN method does not require the buffer to be partitioned into individual queues per virtual channel and it does not require a count to be maintained of cells in the buffer on a per virtual channel basis. Also, the BECN method is simple to implement in any design of ATM switch: input buffered, output buffered, or any other.

The congestion control method of the present invention also provides a simple traffic management mechanism for access to a virtual path into the public network (or a private wide area network). If the BECN mechanism is combined with a virtual path traffic shaper at the access point to the wide area network, a mechanism is provided for multiplexing any number of sources of unknown traffic characteristics into a virtual path of specified statistical traffic characteristics. If a traffic burst exceeds the capacity of the virtual path, the sources may be throttled back by the use of BECN cells. This operation offers much better performance than dropping excess traffic, it also offers much greater statistical gain, and is much easier to manage than trying to specify the traffic characteristics of every individual data source in order to calculate the required parameters of the virtual path. Bandwidth across the wide area network may therefore be reserved on a statistical basis, for each virtual path, and shared efficiently between all active users instantaneously requiring access to any virtual path.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A communication system having reactive congestion control comprising, a plurality of sources, each source including a modifiable issue rate unit which transmits forward information signals at different transmission rates in response to congestion signals, said issue rate unit decreasing a transmission rate in response to congestion signals, a plurality of destinations, one or more nodes, forming an asynchronous transfer mode (ATM) network connecting the sources to the destinations, each node including, a forward path for transfer of information in a forward direction toward a destination through the network, a return path for returning congestion signals in a reverse direction through the network toward a source, congestion signal generating means for generating requests for congestion signals in response to congestion in the node, said congestion signal generating means connected to said return path in said node, filter means for filtering said requests and for responsively providing said congestion signals, said network having a plurality of virtual channels where, for each virtual channel, one of said plurality of sources is linked to one of said plurality of destinations through said network by linking forward paths from one or more nodes, and wherein said issue rate unit transmits forward information signals at different transmission rates in response to congestion signals over the virtual channel, said one of said plurality of destinations is linked to said one of said plurality of sources through said network by linking return paths from said one or more nodes, the congestion signal generating means in one of said intermediate nodes generates said congestion signals for the virtual channel in response to congestion in said one of said intermediate nodes and said congestion signals from said one of said intermediate nodes returns in the reverse direction without need for propagation to said destination.

2. The communication system of claim 1 wherein said filter means includes, storage means for storing congestion indicators, said storage means operative in response to requests to read said storage means to access any stored congestion indicator and thereafter to store a congestion indicator into said storage means, a filter clock providing a filter clock signal having a filter period for resetting said congestion indicators in said storage means, gate means responsive to an absence of a congestion indicator from said storage means and to each of said requests to provide said congestion signal.

3. The communication system of claim 2 wherein said storage means includes a one bit store shared by all of said virtual channels.

4. The communication system of claim 2 wherein said storage means includes a one bit store for each of said virtual channels.

5. The communication system of claim 2 wherein said storage means includes a content addressable memory having a location for each of said virtual channels.

6. The communication system of claim 1 wherein said filter means includes, storage means for storing a congestion indicator for each virtual channel, said storage means operative in response to each request from a virtual channel to read said storage means to access any stored congestion indicator for the virtual channel and thereafter to store a congestion indicator into said storage means for the virtual channel, a filter clock providing a filter clock signal having a filter period for resetting once per filter period said congestion indicators for all virtual channels in said storage means, gate means responsive to an absence of a congestion indicator from said storage means for a virtual channel and to said request signal for a virtual channel to provide said congestion signal.

7. The communication system of claim 1 wherein said issue rate unit increases the transmission rate in response to an absence of congestion signals.

8. The communication system of claim 1 wherein a congestion signal returning from a congested node to the source has a transmission interval that is less than the interval between information signals transmitted over the virtual channel whereby the issue rate unit reactively responds to modify the transmission rate to reduce congestion.

9. The communication system of claim 2 wherein a congestion signal returning from a congested node to the source has a transmission interval and said filter period is related to the transmission interval.

10. The communication system of claim 2 wherein a congestion sisal returning from a congested node to the source has a transmission interval and said filter period is approximately twice the transmission interval.

11. The communication system of claim 1 wherein a congestion signal returning from a congested node to the source has a transmission interval and the transmission interval is short thereby enabling the issue rate unit to reactively modify the transmission rate and thereby reduce congestion.

12. The communication system of claim 1 wherein a congestion signal returning from a congested node to the source has a transmission interval and the transmission interval is less than the interval between information signals transmitted over the virtual channel whereby the issue rate unit reactively responds to modify the transmission rate to reduce congestion.

13. The communication system of claim 1 wherein a congestion signal returning from a congested node to the source has a transmission interval and the transmission interval is less than ten intervals between information signals transmitted over the virtual channel whereby the issue rate unit reactively responds to modify the transmission rate to reduce congestion.

14. The communication system of claim 1 wherein a congestion signal returning from a congested node to the source has a transmission interval and a processing time required to generate said congestion signal at each node wherein said processing time is much less than said transmission interval.

15. The communication system of claim 1 wherein said issue rate unit has means for decreasing said transmission rate by a divide-by-two amount in response to a congestion signal.

16. The communication system of claim 1 wherein said issue rate unit has means for decreasing said transmission rate by a fractional multiple amount in response to a congestion signal.

17. The communication system of claim 16 wherein said issue rate unit, after decreasing said transmission rate at a decreasing rate, has means for increasing said transmission rate at an increasing rate in response to an absence of a congestion signal with said increasing rate varying with the transmission rate whereby lower transmission rates increase faster than higher transmission rates.

18. The communication system of claim 16 wherein the rate of increasing said transmission rate is less than the rate of decreasing said transmission rate.

19. The communication system of claim 1 wherein said forward information signals are fragmented into cells, each cell including a virtual channel identifier, and wherein each node includes a switching element, each switching element including,
   a switch fabric,
   a plurality of port controllers interconnected by said switch fabric, each of said port controllers including,
      an input controller,
      an output controller,
      congestion detection means for detecting congestion in the node,
      reversing means for copying a cell, having a virtual channel identifier, from the forward path to the return path to thereby generate a congestion signal on said return path.

20. The communication system of claim 19 wherein said reversing means includes reverse marker means for marking copied cells with a return path indicator whereby return cells are distinguished from forward cells.

21. The communication system of claim 19 wherein each of said port controllers includes selector means for selecting cells from one virtual channel for the forward path or from another virtual channel for the return path.

22. The communication system of claim 21 wherein said selector means grants priority to cells from the return path whereby congestion signals are given priority in the network.

23. The communication system of claim 19 wherein said forward path includes a queue for storing cells in the forward direction and having a queue fullness, said queue including means for providing a queue-level signal, as a function of the queue fullness, to form the congestion signal.

24. The communication system of claim 1 wherein said forward information signals are fragmented into cells, each cell including a virtual channel identifier, and wherein each node includes a switching element, each switching element including,
   a switch fabric,
   a plurality of port controllers interconnected by said switch fabric, each port controller connected to a communication link and each port controller including,
      an input controller for said link including a translator for receiving the virtual channel identifier of incoming cells on the link and responsively translating the input virtual channel identifier of incoming cells to an output virtual channel identifier of outgoing cells for another link for another port controller connected to said switch fabric,
      an output controller for said link,
      congestion detection means for detecting congestion in the node,
      reversing means for copying a cell, having a virtual channel identifier, from the forward path to the return path to thereby generate a congestion signal on said return path, said reversing means connecting said output virtual channel identifier to be reverse translated to said input virtual channel identifier whereby the virtual channel identifiers for cells in the forward path and in the return path over the link are the same.

25. The communication system of claim 24 wherein said port controller includes one or more queues connected in parallel for queuing cells for the forward path and the return path of a link, said queues providing queue-level signals indicating the fullness of the queues and including selection means for selecting cells from said queues.

26. The communication system of claim 25 wherein said selector means grants priority to cells from the return path whereby congestion signals are given priority in the network.

27. The communication system of claim 24 wherein said reversing means includes reverse marker means for marking copied cells with a return path indicator whereby return cells are distinguished from forward cells.

28. The communication system of claim 24 wherein each of said port controllers includes selector means for selecting cells from one virtual channel for the forward path or from another virtual channel for the return path.

29. The communication system of claim 25 wherein said selector means grants priority to cells from the return path whereby congestion signals are given priority in the network.

30. The communication system of claim 24 wherein said forward path includes a queue for storing cells in the forward direction and having a queue fullness, said queue including means for providing a queue-level signal, as a function of the queue fullness, to form the congestion signal.

31. A wide-area communication system having local reactive congestion control comprising, a plurality of local communication systems, each local communication system including, a plurality of local sources, each local source including a modifiable issue rate unit which transmits forward information signals at different transmission rates, said issue rate unit decreasing the transmission rate in response to a presence of congestion signals and increasing the transmission rate in response to an absence of congestion signals, a plurality of local destinations, one or more local nodes forming an asynchronous transfer mode (ATM) local network connecting the sources to the destinations, each local node including, a forward path for transfer of information at different selectable transmission rates in a forward direction toward a destination through the network, a return path for returning congestion signals in a reverse direction through the network toward a source, congestion signal generating means for generating requests for congestion signals in response to congestion in the local node, said congestion signal generating means connected to said return path in said local node.

filter means for filtering said requests and for responsively providing said congestion signals, said network having a plurality of virtual channels where, for each virtual channel, one of said plurality of local sources is linked to one of said plurality of local destinations through said local network by linking forward paths from one or more local nodes, and wherein said issue rate unit transmits forward information signals at different transmission rates in response to congestion signals over the virtual channel, said one of said plurality of local destinations is linked to said one of said plurality of local sources through said network by linking return paths from said one or more local nodes, the congestion signal generating means in one of said local nodes generates said requests for congestion signals for the virtual channel in response to congestion in said one of said local nodes and returns said congestion signals from said one of said local nodes in the reverse direction, one or more wide-area sources connected to one of said local networks, one or more wide-area destinations connected to another one of said local networks, a plurality of local network links interconnecting two or more local networks to form a wide-area network, said wide-area network having a plurality of virtual channels where, for each virtual channel, one of a plurality of wide-area sources is linked to one of a plurality of wide-area destinations through a plurality of said local networks over said local networks and said local network links.

32. The wide-area communication system of claim 31 wherein a congestion signal returning from a congested..local node to the local source has a transmission interval and the transmission interval is short thereby enabling the issue rate unit to reactively modify the transmission rate and thereby reduce congestion in the wide-area communication system.

33. The wide-area communication system of claim 31 wherein a congestion signal returning from a congested local node to the local source has a transmission interval and the transmission interval is less than the interval between information signals transmitted over the virtual channel whereby the issue rate unit reactively responds to modify the transmission rate to reduce congestion in the wide-area communication system.

34. The wide-area communication system of claim 31 wherein a congestion signal returning from a congested local node to the local source has a transmission interval and the transmission interval is less than ten intervals between information signals transmitted over the virtual channel whereby the issue rate unit reactively responds to modify the transmission rate to reduce congestion in the wide-area communication system.

35. The wide-area communication system of claim 31 wherein a congestion signal returning from a congested node to the source has a transmission interval and a processing time required to generate Said congestion signal at each node wherein said processing time is much less than said transmission interval.

36. The communication system of claim 31 wherein said issue rate unit has means for decreasing said transmission rate by a divide-by-two amount in response to a congestion signal.

37. The communication system of claim 31 wherein said issue rate unit has means for decreasing said transmission rate by a fractional multiple amount in response to a congestion signal.

38. The communication system of claim 37 wherein said issue rate unit, after decreasing said transmission rate at a decreasing rate, has means for increasing said transmission rate at an increasing rate in response to an absence of a congestion signal with said increasing rate varying with the transmission rate whereby lower transmission rates increase faster than higher transmission rates.

39. The wide-area communication system of claim 31 wherein said forward information is fragmented into cells, each cell including a virtual channel identifier, and wherein each node includes a switching element, each switching element including, a switch fabric, a plurality of port controllers interconnected by said switch fabric, each of said port controllers including, an input controller, and an output controller, congestion detection means for detecting congestion in the node, reversing means for copying a cell, having a virtual channel identifier, from the forward path to the return path to thereby generate a congestion signal on said return path.

40. The wide-area communication system of claim 39 wherein said reversing means includes reverse marker means for marking copied cells with a return path indicator whereby return cells can be distinguished from forward cells.

41. The wide-area communication system of claim 39 wherein each of said port controllers includes selector means for selecting cells from one virtual channel for the forward path or from another virtual channel for the return path.

42. The wide-area communication system of claim 39 wherein said selector means grants priority to cells from the return path whereby congestion signals are given priority in the network.

43. The wide-area communication system of claim 42 wherein said forward paths include queues for storing cells in the forward direction, each of said queues including means for providing a queue-level signal, as a function of the fullness of the queue, to form the request for a congestion signal in response to the queue-level signal.

44. The wide-area communication system of claim 31 wherein said forward information signals are fragmented into cells, each cell including a virtual channel identifier, and wherein each node includes a switching element, each switching element including, a switch fabric, a plurality of port controllers interconnected by said switch fabric, each port controller connected to a communication link and each port controller including, an input controller for said link including a translator for receiving the virtual channel identifier of incoming cells on the link and responsively translating the input virtual channel identifier of incoming cells to an output virtual channel identifier of outgoing cells for another link for another port controller connected to said switch fabric, an output controller for said link, congestion detection means for detecting congestion in the node, reversing means for copying a cell, having a virtual channel identifier, from the forward path to the return path to thereby generate a congestion signal on said return path, said reversing means connecting said output virtual channel identifier to be reverse translated to said input virtual channel identifier whereby the virtual channel identifiers for cells in the forward path and in the return path over the link are the same.

45. A communication system having reactive congestion control comprising, a plurality of sources, each source including a modifiable issue rate unit which transmits forward information signals at different transmission rates in response to congestion signals, said issue rate unit decreasing a transmission rate in response to congestion signals, a plurality of destinations, a plurality of nodes, including one or more intermediate nodes, forming an asynchronous transfer mode (ATM) network connecting the sources to the destinations, each intermediate node including, a forward path for transfer of information in a forward direction toward a destination through the network, a return path for returning congestion signals in a reverse direction through the network toward a source, congestion signal generating means for generating requests for congestion signals in response to congestion in the intermediate node, said congestion signal generating means connected to said return path in said intermediate node, filter means for filtering said requests and for responsively providing said congestion signals to said return path for propagation directly to one of said sources, said network having a plurality of virtual channels where, for each virtual channel, one of said plurality of sources is linked to one of said plurality of destinations through said network by linking forward paths from one or more nodes, and wherein said issue rate unit transmits forward information signals at different transmission rates in response to congestion signals over the virtual channel, said one of said plurality of destinations is linked to said one of said plurality of sources through said network by linking return paths from said one or more nodes, the congestion signal generating means in one of said intermediate nodes generates said congestion signals for the virtual channel in response to congestion in said one of said intermediate nodes and said congestion signals from said one of said intermediate nodes returns in the reverse direction without need for propagation to said destination.

\* \* \* \* \*